United States Patent
Pillay-Esnault et al.

(10) Patent No.: US 10,958,623 B2
(45) Date of Patent: Mar. 23, 2021

(54) IDENTITY AND METADATA BASED FIREWALLS IN IDENTITY ENABLED NETWORKS

(71) Applicant: Futurewei Technologies, Inc., Plano, TX (US)

(72) Inventors: Padmadevi Pillay-Esnault, San Jose, CA (US); Alexander Clemm, Los Gatos, CA (US); Uma S. Chunduri, Fremont, CA (US)

(73) Assignee: Futurewei Technologies, Inc., Plano, TX (US)

( * ) Notice: Subject to any disclaimer, the term of this patent is extended or adjusted under 35 U.S.C. 154(b) by 188 days.

(21) Appl. No.: 15/969,135

(22) Filed: May 2, 2018

(65) Prior Publication Data

US 2018/0343236 A1 Nov. 29, 2018

Related U.S. Application Data

(60) Provisional application No. 62/511,579, filed on May 26, 2017.

(51) Int. Cl.
*H04L 29/06* (2006.01)

(52) U.S. Cl.
CPC ...... *H04L 63/0236* (2013.01); *H04L 63/0263* (2013.01); *H04L 63/20* (2013.01)

(58) Field of Classification Search
CPC .. H04L 63/0236; H04L 63/0263; H04L 63/20
See application file for complete search history.

(56) References Cited

U.S. PATENT DOCUMENTS

| 6,718,024 B1* | 4/2004 | Heilmann | H04L 63/0218 |
| | | | 379/189 |
| 8,898,728 B2* | 11/2014 | Sreehari et al. | G06F 15/16 |
| 8,930,529 B1* | 1/2015 | Wang | H04L 61/15 |
| | | | 709/224 |
| 9,392,010 B2* | 7/2016 | Friedman | H04L 63/1416 |
| 2009/0193506 A1* | 7/2009 | McGrew | H04L 63/0263 |
| | | | 726/6 |
| 2012/0250682 A1* | 10/2012 | Vincent | H04L 12/4633 |
| | | | 370/390 |
| 2012/0290703 A1* | 11/2012 | Barabash | H04L 63/20 |
| | | | 709/223 |

(Continued)

OTHER PUBLICATIONS

Herbert, "Identifier Locator Addressing Mapping Protocol," draft-herbert-ila-ilamp-00, Dec. 21, 2017, 20 pages.

(Continued)

*Primary Examiner* — Joseph P Hirl
*Assistant Examiner* — Stephen T Gundry
(74) *Attorney, Agent, or Firm* — Conley Rose, P.C.

(57) ABSTRACT

A method implemented by a firewall device in a network, comprising storing, by a memory, a firewall policy comprising information indicating whether to forward a data packet from a sending host entity to a receiving host entity, receiving, by a receiver, a data packet from a sending host entity, wherein the data packet includes an identifier of the receiving host entity, and determining, by a processor coupled to the memory and the receiver, whether to forward the data packet to the receiving host entity based on the firewall policy and the identifier of the receiving host entity.

20 Claims, 10 Drawing Sheets

(56) References Cited

U.S. PATENT DOCUMENTS

| | | | |
|---|---|---|---|
| 2013/0097658 A1* | 4/2013 | Cooper | H04L 63/0209 726/1 |
| 2013/0097692 A1* | 4/2013 | Cooper et al. | G06F 21/00 |
| 2013/0103834 A1* | 4/2013 | Dzerve et al. | G06F 15/173 |
| 2013/0117847 A1* | 5/2013 | Friedman et al. | G06F 15/16 |
| 2013/0152187 A1* | 6/2013 | Strebe | H04L 63/08 726/11 |
| 2013/0275574 A1* | 10/2013 | Hugard, IV | H04L 63/00 709/224 |
| 2014/0237539 A1* | 8/2014 | Wing | H04L 69/22 726/1 |
| 2014/0237584 A1* | 8/2014 | Cooper et al. | H04L 63/0209 |
| 2015/0163158 A1* | 6/2015 | Ryland | H04L 12/911 |
| 2015/0188949 A1* | 7/2015 | Mahaffey | H04W 12/0027 726/1 |
| 2015/0326532 A1* | 11/2015 | Grant | H04L 63/0263 726/1 |
| 2016/0380970 A1* | 12/2016 | Jacobson | H04L 9/14 713/176 |
| 2017/0063782 A1* | 3/2017 | Jain et al. | H04L 29/12 |
| 2017/0063787 A1* | 3/2017 | Kwok | H04L 63/20 |
| 2017/0134428 A1* | 5/2017 | Vazquez Carames | H04L 61/2007 |
| 2017/0279717 A1* | 9/2017 | Bethers | H04L 45/748 |
| 2017/0317978 A1* | 11/2017 | Diaz-Cuellar | H04L 63/0272 |
| 2017/0364702 A1* | 12/2017 | Goldfarb | H04L 63/14 |
| 2018/0026944 A1* | 1/2018 | Phillips | H04L 63/0263 726/4 |
| 2018/0041470 A1* | 2/2018 | Schultz | H04L 47/24 |
| 2018/0083837 A1* | 3/2018 | Teng et al. | H04L 12/24 |
| 2018/0167362 A1* | 6/2018 | Glenn | H04L 63/0236 |
| 2018/0234459 A1* | 8/2018 | Kung et al. | H04L 29/06 |
| 2018/0295036 A1* | 10/2018 | Krishnannurthy et al. | H04L 12/26 |
| 2019/0394244 A1* | 12/2019 | Narayanaswamy | H04L 67/306 |
| 2020/0228501 A1* | 7/2020 | Grant | H04L 67/10 |

OTHER PUBLICATIONS

Pillay-Esnault, Ed., et al., "Requirements for Generic Resilient Identity Services in Identity Enabled Networks," draft-padma-ideas-req-grids-00, Mar. 13, 2017, 15 pages.

Farinacci, et al. "The Locator/ID Separation Protocol (LISP)," RFC 6830, Jan. 2013, 75 pages.

Moskowitz, Ed., et al., "Host Identity Protocol Version 2 (HIPv2)," RFC 7401, Apr. 2015, 128 pages.

Clemm, et al., "Identifier-Based Resolution of Identities," U.S. Appl. No. 15/924,919, filed Mar. 19, 2018, 31 pages.

Pillay-Esnault, et al., "Anonymous Identity in Identity Oriented Networks and Protocols," U.S. Appl. No. 15/491,828, filed Apr. 19, 2017, 37 pages.

* cited by examiner

400

| Identity of Sending Host Entity 403 | Identifier-to-Locator Mappings 409 | Metadata 413 | Identity Based Firewall Policies 418 | Metadata Based Firewall Policies 424 |
|---|---|---|---|---|
| Identity of Receiving Host Entity 406 | Identifier to Locator Mappings 411 | Metadata 415 | Identity Based Firewall Policies 421 | Metadata Based Firewall Policies 427 |

IDENTITY AND METADATA BASED FIREWALLS IN IDENTITY ENABLED NETWORKS

CROSS-REFERENCE TO RELATED APPLICATIONS

The present application claims benefit of U.S. Provisional Patent Application No. 62/511,579 filed May 26, 2017, by Padmadevi Pillay-Esnault, et al. and entitled "Identifier-Based Firewalls in Identity-Oriented Networks," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In traditional Internet Protocol (IP) networks, there are many different devices used to block incoming traffic. For example, there are devices that function as firewalls at different layers of the stack. It is possible to use proxies or network address translation (NAT) to enforce some level of security. Network layer firewalls filter traffic based on packet header fields like source IP address, Transmission Control Protocol (TCP)/User Datagram Protocol (UDP) source port, destination IP address, TCP/UDP destination port, and so on. Application layer firewalls are more sophisticated and monitor the sessions by, for example, listening to the sockets and filtering the packets exchanged by an application. Proxies provide protection by creating an indirection where the end user is not directly on the internet gateway. Proxies can screen and block packets. Firewalls have also NAT capabilities and are used to hide the addresses of devices from being exposed, which makes them less vulnerable. A next-generation firewall (NGFW) performs deep packet inspection and uses a more thorough inspection by checking packet payloads and matching signatures for harmful activities such as attacks using malware, and so on.

SUMMARY

According to one aspect of the present disclosure, there is provided a method implemented by a firewall device in a network, comprising storing, by a memory, a firewall policy comprising information indicating whether to forward a data packet from a sending host entity to a receiving host entity, receiving, by a receiver, a data packet from a sending host entity, wherein the data packet includes an identifier of the receiving host entity, determining, by a processor coupled to the memory and the receiver, whether to forward the data packet to the receiving host entity based on the firewall policy and the identifier of the receiving host entity.

Optionally, in any of the preceding aspects, another implementation of the aspect provides that the method further comprises receiving, by the receiver, the firewall policy from the receiving host entity.

Optionally, in any of the preceding aspects, another implementation of the aspect provides that the method further comprises receiving, by the receiver, the firewall policy from a distributed mapping system configured to store the firewall policy of the receiving host entity and identifier-to-locator mappings for a plurality of host entities in the network.

Optionally, in any of the preceding aspects, another implementation of the aspect provides that the firewall policy comprises a plurality of identifiers of a plurality of different host entities, and wherein determining whether to forward the data packet to the receiving host entity based on the firewall policy comprises determining whether the identifier in the source identifier field matches one of the plurality of identifiers in the firewall policy.

Optionally, in any of the preceding aspects, another implementation of the aspect provides that the firewall policy comprises metadata describing a plurality of different host entities, and wherein determining whether to forward the data packet to the receiving host entity based on the firewall policy comprises determining whether metadata of the sending host entity matches the metadata in the firewall policy.

Optionally, in any of the preceding aspects, another implementation of the aspect provides that the method further comprises determining, by the processor, another firewall policy for another host entity based on similarities between the receiving host entity and the other host entity, receiving, by the receiver, a second data packet including an identifier of the sending host entity in a source identifier field and an identifier of the other host entity in a destination identifier field, and determining, by the processor, whether to forward the second data packet to the other host entity based on the firewall policy.

Optionally, in any of the preceding aspects, another implementation of the aspect provides that the method further comprises periodically polling a distributed mapping system for an update to the firewall policy, wherein the distributed mapping system is configured to store identifier-to-locator mappings for a plurality of host entities in the network and the firewall policy for the receiving host entity.

According to one aspect of the present disclosure, there is provided a firewall device implemented as a network element in a network, comprising a memory configured to store a firewall policy comprising information indicating whether to forward a data packet from a sending host entity to a receiving host entity, a receiver configured to receive a data packet from a sending host entity, wherein the data packet includes an identifier of the receiving host entity, and a processor coupled to the memory and the receiver, wherein the processor is configured to determine whether to forward the data packet to the receiving host entity based on the firewall policy and the identifier of the receiving host entity.

Optionally, in any of the preceding aspects, another implementation of the aspect provides that the receiver is further configured to receive the firewall policy and a subsequent update to the firewall policy directly from the receiving host entity.

Optionally, in any of the preceding aspects, another implementation of the aspect provides that wherein the receiver is further configured to receive the firewall policy and a subsequent update to the firewall policy directly from a distributed mapping system, wherein the distributed mapping system is configured to store the firewall policy of the receiving host entity and identifier-to-locator mappings for a plurality of host entities in the network.

Optionally, in any of the preceding aspects, another implementation of the aspect provides that wherein the firewall policy comprises a plurality of identifiers of a plurality of different host entities, and wherein the processor is configured to discard the data packet when the identifier in the source identifier field matches one of the plurality of identifiers in the firewall policy.

Optionally, in any of the preceding aspects, another implementation of the aspect provides that wherein the processor is configured to determine additional policies for a plurality of different host entities based on similarities between the firewall policy and metadata associated with the receiving host entity.

According to one aspect of the present disclosure, there is provided a distributed mapping system implemented as a network element in a network, comprising a memory storage comprising instructions, one or more processors in communication with the memory storage, wherein the one or more processors execute the instructions to receive a message comprising a firewall policy from a receiving host entity, wherein the firewall policy comprises information indicating whether to forward a data packet from a sending host entity to a receiving host entity, and determine whether to transmit a locator of the receiving host entity to the sending host entity based on the firewall policy and an identifier of the receiving host entity.

Optionally, in any of the preceding aspects, another implementation of the aspect provides that wherein the one or more processors execute the instructions to determine whether to transmit the locator of the receiving host entity to the sending host entity based on the firewall policy in response to receiving a locator request from the sending host entity, wherein the locator request comprises an identifier of the receiving host entity.

Optionally, in any of the preceding aspects, another implementation of the aspect provides that wherein the firewall policy comprises a plurality of identifiers of a plurality of different host entities.

Optionally, in any of the preceding aspects, another implementation of the aspect provides that wherein the firewall policy comprises a metadata describing a plurality of different host entities.

Optionally, in any of the preceding aspects, another implementation of the aspect provides that wherein the one or more processors further execute the instructions to determine a second policy for another host entity based on similarities between the receiving host entity and the other host entity.

Optionally, in any of the preceding aspects, another implementation of the aspect provides that wherein the one or more processors further execute the instructions to periodically send updates to the firewall policies to one or more firewalls in the network, wherein the one or more firewalls are associated with the receiving host entity.

Optionally, in any of the preceding aspects, another implementation of the aspect provides that wherein the firewall policy indicates a type of host entity that is not permitted to send data packets to the receiving host entity.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 4 is a diagram illustrating the information that a distributed mapping system maintains to provide the mapping service, metadata service, and policy service to host entities and.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Host entities in an IEN may be associated with an identity (also referred to herein as IDy), which is a private and fixed identifier of a host entity that is not publicly known. The identity of a host entity may remain unchanged. For example, only an administrator of an IEN may know the identity associated with various host entities. Each host entity in an IEN may be identified using one or more identifier, which may be publicly known. Some identifiers may be anonymized identifiers and some identifiers may be publicly known and not anonymized, which may be referred to herein as a U-ID or U-IDf. A U-IDf is a publicly available fixed ND point identifier that uniquely identifies the host entity. The anonymized identifiers and the U-IDf may be referred to herein as IDf. A host entity in an IEN is also identified using a locator. A locator is an address of a location by which the host entity may be reached. A host entity may register with, or associate with and authenticate with, a distributed mapping system by sending the U-IDf and the locator of the host entity to the distributed mapping system. The distributed mapping system may be a combination of distributed computing resources that are executed together to implement a set of services that manages identification data for various host entities that have registered with the distributed mapping system.

Disclosed herein are embodiments directed to providing identity based (IDy-based) and metadata based firewalls in an IEN, where the firewalls are positioned throughout the IEN and configured to communicate with the distributed mapping system. In an embodiment, host entities may generate firewall policies and register the firewall policies with the distributed mapping system. The firewall policies may be based on an identity of a source of a data packet or metadata associated with a source of a data packet. The distributed mapping system may send the firewall policies to one or more firewall devices in the IEN. The firewall devices may be configured to determine whether to forward or discard data packets based on the firewall policies.

Figure 1:
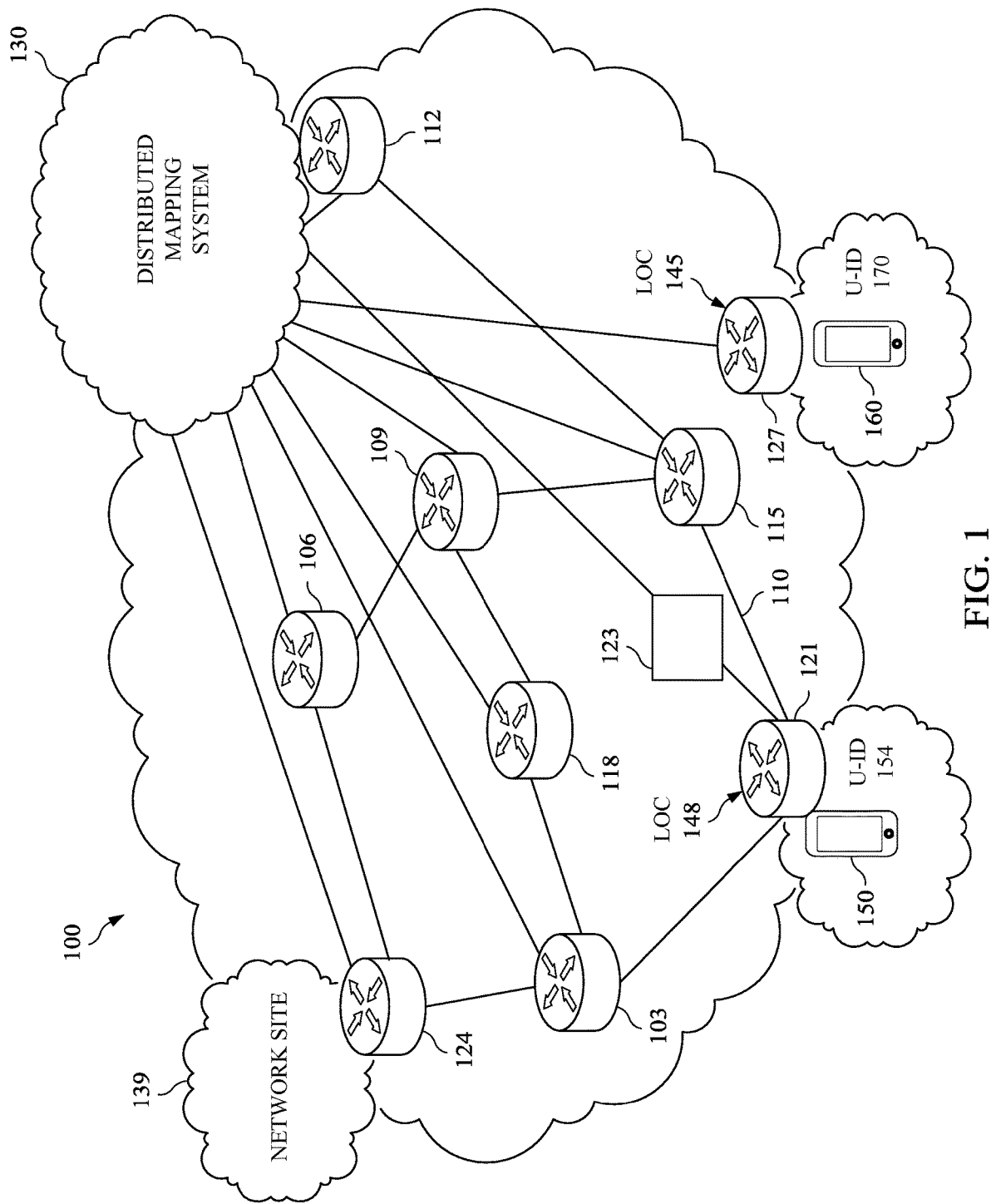
FIG. 1 illustrates an embodiment of an identity enabled network (TEN).

FIG. 1 illustrates an embodiment of an IEN 100. For example, the IEN 100 may be a network implementing Locator identifier Separation Protocol (LISP), Host Identity Protocol (HIP), or any other IEN that would be recognized by one of ordinary skill in the art. LISP may be implemented according to Internet Engineering Task Force (IETF) Request for Comments (RFC) 6830, titled "The LOC/ID Separation Protocol," dated January 2013, which is hereby incorporated by reference in its entirety. HIP may be implemented according to IETF RFC 7401, titled "Host Identity Protocol Version 2 (HIPv2)," dated April 2015, which is hereby incorporated by reference in its entirety. In some embodiments, IEN 100 may be a network implementing Identifier Locator Addressing Mapping Protocol according to IETF draft document titled "Identifier Locator Addressing Mapping Protocol," dated Dec. 21, 2017, which is hereby incorporated by reference in its entirety.

IEN 100 generally comprises a plurality of routers 103, 106, 109, 112, 115, and 118, and a plurality of network devices (NDs) 121, 124, and 127 (also referred to as identifier oriented network entities). For example, NDs 121, 124, and 127 may be a router, a switch, a bridge, a gateway, a base station, an access point, or any network device with identifier enabled networking capabilities. In one embodiment, host entities 150 and 160 may be communication endpoints, such as, for example, a user equipment (UE), a network site, or a software process that needs to be identified. In one embodiment, tunnel endpoints for a tunnel established in IEN 100 may be the NDs 121, 124, or 127 when the IEN 100 implements a network based scheme. In another embodiment, the tunnel endpoints may be the actual host entities 150 and 160 when the IEN 100 implements a host based scheme.

In some embodiments, routers 103, 106, 109, 112, 115, and 118 may be IP routers, implementing IPv4 or IPv6, or label switch routers (LSRs) that are configured to interconnect NDs 121, 124, and 127. In an embodiment, the routers 103, 106, 109, 112, 115, and 118 may be a router, one or more provider edge (PE) routers, one or more source PE routers, one or more rendezvous point (RP) PE routers, one or more customer edge (CE) routers, or one or more core routers. For example, at least one of routers 103, 106, 109, 112, 115, and 118 may be a receiver PE router, a CE router, and/or a source PE router, which is configured to form an interface between the service provider network and one or more CE routers. The routers 103, 106, 109, 112, 115, and 118 may each be a device configured to forward data packets within a network and/or between multiple networks. For example, router 118 may be a router within a service provider network and may be configured to form a portion of a backbone or core for the service provider network.

Additionally, the routers 103, 106, 109, 112, 115, and 118 and the NDs 121, 124, and 127 may be interconnected and in data communication with each other via one or more links 110 (e.g., a wireless link or a wired link). Further, the IEN 100 is configured to employ an IP or non-IP protocol as would be appreciated by one of ordinary skill in the art upon viewing this disclosure. In an embodiment, NDs 121, 124, and 127 may comprise a local identifier-to-locator database and a firewall policy database, as will be further discussed below.

In an embodiment, one or more of NDs 121, 124, and 127 may generally be characterized as a CE router where a host entity, such as host entities 150 and 160, is attached such that the host entity is reachable by an ND. As shown in FIG. 1, host entity 150 is associated with, or reachable by, ND 121, and host entity 160 is associated with ND 127. For example, network site 139 may be a host entity behind ND 124. A host entity 150 or 160 may be a device, node, or software process used for IP-based or Layer-2 based data communication. Each of the routers 103, 106, 109, 112, 115, and 118 and NDs 121, 124, and 127 may be configured to employ a routing table, forwarding table, network table, or the like, to control and/or direct data traffic for a given network. For example, each of the routers 103, 106, 109, 112, 115, and 118 and NDs 121, 124, and 127 may generate or establish a routing table to coordinate data communication with other routers within the IEN 100. In an example embodiment, the routing table may be established via a flooding algorithm, a spanning trees algorithm, a reverse path broadcasting algorithm, a truncated reverse path broadcasting algorithm, a reverse path multicasting algorithm, a core-based tree algorithm, or any other suitable multicast forwarding algorithm as would be appreciated by one of ordinary skill in the art upon viewing this disclosure.

The IEN 100 also includes a distributed mapping system 130, which may be configured to execute GeneRic Identity Services (GRIDS) for host entities 150 and 160. The distributed mapping system 130 may execute GRIDS, which is a set of services that together manage the lifecycle of identifiers for host entities 150 and 160, register firewall policies of host entities 150 and 160, obtain metadata identifying and describing host entities 150 and 160 and entity collections, map and resolve identifiers and locators of host entities 150 and 160, associate metadata with host entities 150 and 160 and entity collections, and implement firewall policies for host entities 150 and 160. The set of services that are provided by GRIDS include, for example, a mapping service, a metadata service, and a firewall policy service, as will be further discussed below with reference to FIG. 3. In an embodiment, distributed mapping system 130 is configured to execute these services to provide these services to host entities 150 and 160 that have registered with the distributed mapping system 130.

The distributed mapping system 130 may be configured to execute a set of services for host entities 150 and 160 that have registered with the distributed mapping system 130, such as identifier lifecycle services, mapping services, metadata services, firewall policy services, and other services for host entities 150 and 160. For example, the distributed mapping system 130 may be a distributed GRIDS (also referred to as a GeneRic Identity Service (GRIDS)) system configured to execute GRIDS. The GRIDS are further described in IETF draft document entitled "Requirements for Generic Identity Services in Identity Enabled Networks," by P. Pillay-Esnault et al, dated Jul. 3, 2017, version 1, which is hereby incorporated by reference in its entirety.

The distributed mapping system 130 is also configured to register U-IDfs, advertise U-IDfs, and aggregate U-IDfs into a distributed database so that NEs over various geographic areas can locate a host entity 150 or 160 associated with a U-IDf. In an embodiment, the distributed mapping system 130 stores identity-to-identifier mappings (IDy-to-IDf mappings), identifier-to-locator mappings (IDfs-to-LOC mappings) of all the host entities 150 and 160 and network sites 139 in IEN 100. The identity to identifier mappings (IDy-to-IDf mappings) are further described in U.S. patent application Ser. No. 15/924,919, titled "Identifier-Based Resolution of Identities," by Padmadevi Pillay-Esnault, filed Mar. 19, 2018, which is hereby incorporated by reference in its entirety. The distributed mapping system 130 may be connected to routers 103, 106, 109, 112, 115, and 118 and NDs 121, 124, and 127 via links 110. In an embodiment, the distributed mapping system 130 may be deployed in a cloud computing environment. For example, the distributed mapping system 130 may be deployed as an infrastructure comprising a plurality of distributed servers. The distributed mapping system 130 may include multiple access points that are located proximate to host entities 150 and 160 and/or NDs 121, 124, and 127.

In some embodiments, the distributed mapping system 130 comprises a database storing metadata for each host entity 150 and 160, firewall policies governing how to anonymize the host entities 150 and 160, and locators for each of the host entities 150 and 160. According to some embodiments, each host entity 150 and 160 is associated with one or more anonymized identifiers, which may be determined by the host entity 150 and 160 itself, a third party administrator entity, or the distributed mapping system 130.

The way of anonymizing host entities 150 and 160 may be as defined in U.S. patent application Ser. No. 15/491,828, entitled "Anonymous Identity in Identity Oriented Networks and Protocols," by Padmadevi Pillay-Esnault, filed Apr. 19, 2017, which is hereby incorporated by reference in its entirety. An anonymized identifier may be any string of alphanumeric characters that identifies a host entity and is private such that the anonymized identifier may or may not be publicly advertised to all and a third party may not be able to determine that the anonymized identifier uniquely identifies a particular host entity. An anonymized identifier may be an ephemeral identifier, or a temporal identifier that is fleeting in nature. For example, the anonymized identifier may be of any form, such as, for example, an IP address, a Fully Qualified Domain Name (FQDN), or a proprietary format. For example, an anonymized identifier may have a limited purpose and lifetime and may be recycled to use again as identifying the host entity or another host entity. A host entity may have several anonymized identifiers that identify the host entity at one time. For example, different applications executing on a host entity simultaneously may use different anonymized identifiers. The host entity may also use the U-ID and the anonymized identifiers to communicate with other host entities and network sites simultaneously. The distributed mapping system 130 will maintain all the anonymized identifiers and anonymization policies on behalf of each of the host entities 150 and 160 that have registered with the distributed mapping system 130.

In some embodiments, each ND 121, 124, and 127 advertises the identifiers that are accessible by the ND 121, 124, and 127 and sends the identifiers in addition to the locator of the ND 121, 124, and 127 to the distributed mapping system 130. As shown in FIG. 1, the U-ID 154 is an identifier assigned to host entity 150, which is communicatively coupled to ND 121. ND 121 has an address of locator 148 (shown as LOC 148 in FIG. 1), and therefore, the distributed mapping system 130 maps U-ID 154 to locator 148. Similar, U-ID 170 is an identifier assigned to host entity 160, which is communicatively coupled to ND 127. ND 127 has an address of locator 145 (shown as LOC 145 in FIG. 1), and therefore, the distributed mapping system 130 maps U-ID 170 to LOC 145.

A receiving host entity, such as host entity 150, is a host entity that receives data plane traffic from a sending host entity. A sending host entity, such as host entity 160, sends the data plane traffic to the receiving host entity 150. Before a sending host entity 160 initiates communication with a receiving host entity 150, the sending host entity 160 must send a locator request to resolve the receiving host entity's 150 locator. The locator is a location, such as an IP address, a Media Access Control (MAC) address, or a label, of an ND 121 by which the receiving host entity 150 can be reached. In response to a locator request made for a receiving host entity's 150 locator, the distributed mapping system 130 will subsequently return not just the locator 148, but may also return the anonymized identifier that the sending host entity 160 should use to identify the receiving host entity 150 in the data plane. In some embodiments, ND 127 and/or the sending host entity 160 may locally cache the locator 148 in association with the U-ID of the receiving host entity 150 such that the sending host entity 160 may use the locally cached locator 148 in future attempts to communicate with the receiving host entity 150 (without having to query the distributed mapping system 130).

Firewalling refers to the process of filtering data packets such that a data packet is dropped before being received by, for example, a receiving host entity 150. A firewall device 123 may be responsible for performing firewalling for one or more receiving host entities 150. In a typical IP network, a firewall device 123 filters packets based on an IP address indicated in the source IP address field of a data packet. For example, a receiving host entity 150 may generate a blacklist of IP addresses, and a firewall device 123 may be configured to block data packets having a source IP address that matches any of the IP address in the blacklist. However, attackers may easily use fake IP addresses in a source identifier field of a data packet to avoid being filtered by the firewall device 123. Therefore, firewalling using IP addresses may not be a secure method of protecting receiving host entities 150 from attackers.

As shown in FIG. 1, the firewall device 123 is positioned as a separate node from the receiving host entity 150. In an embodiment, the firewall device 123 may be a proxy of one or more receiving host entities 150 acting under the control of and on behalf of the receiving host entity 150. In an embodiment, the firewall device 123 may also be attached to a receiving host entity 150 or an ND 121 associated with the receiving host entity 150. Typically, a firewall device 123 is positioned at a location proximate to the receiving host entity 150. In this way, it is the burden of the receiving host entity 150 to perform firewalling on behalf of the receiving host entity 150. In this way, when a sending host entity 160 acting as an attacker sends a data packet to a receiving host entity 150 over a large spanning backbone network, the data packet has to travel through the entire backbone network before reaching a firewall device 123 proximate to the receiving host entity 150.

According to some embodiments, the receiving host entity 150 may advertise firewall policies that indicate whether to forward a data packet from a sending host entity 160 to a receiving host entity 150. In an embodiment, the firewall policy may be an identity based firewall policy indicating that data packets from entities having certain identities should be dropped before being received by the receiving host entity 150. In an embodiment, the firewall policy may be a metadata based policy indicating that data packets from entities associated with certain metadata should be dropped before being received by the receiving host entity 150. In an embodiment, a receiving host entity 150 may register a firewall policy with the distributed mapping system 130 during registration or after registration. The distributed mapping system 130 or the receiving host entity 150 may send the firewall policies to one or more associated firewalls 123 positioned throughout IEN 100. In an embodiment, a firewall device 123 positioned closer to the sending host entity 160 may be configured to perform firewalling according to firewall policies of the receiving host entity 150. In this embodiment, data packets may be dropped faster and closer to the sending host entity 160 rather than having to travel through one or more networks to reach a firewall device 123 of a receiving host entity 150.

Figure 2:
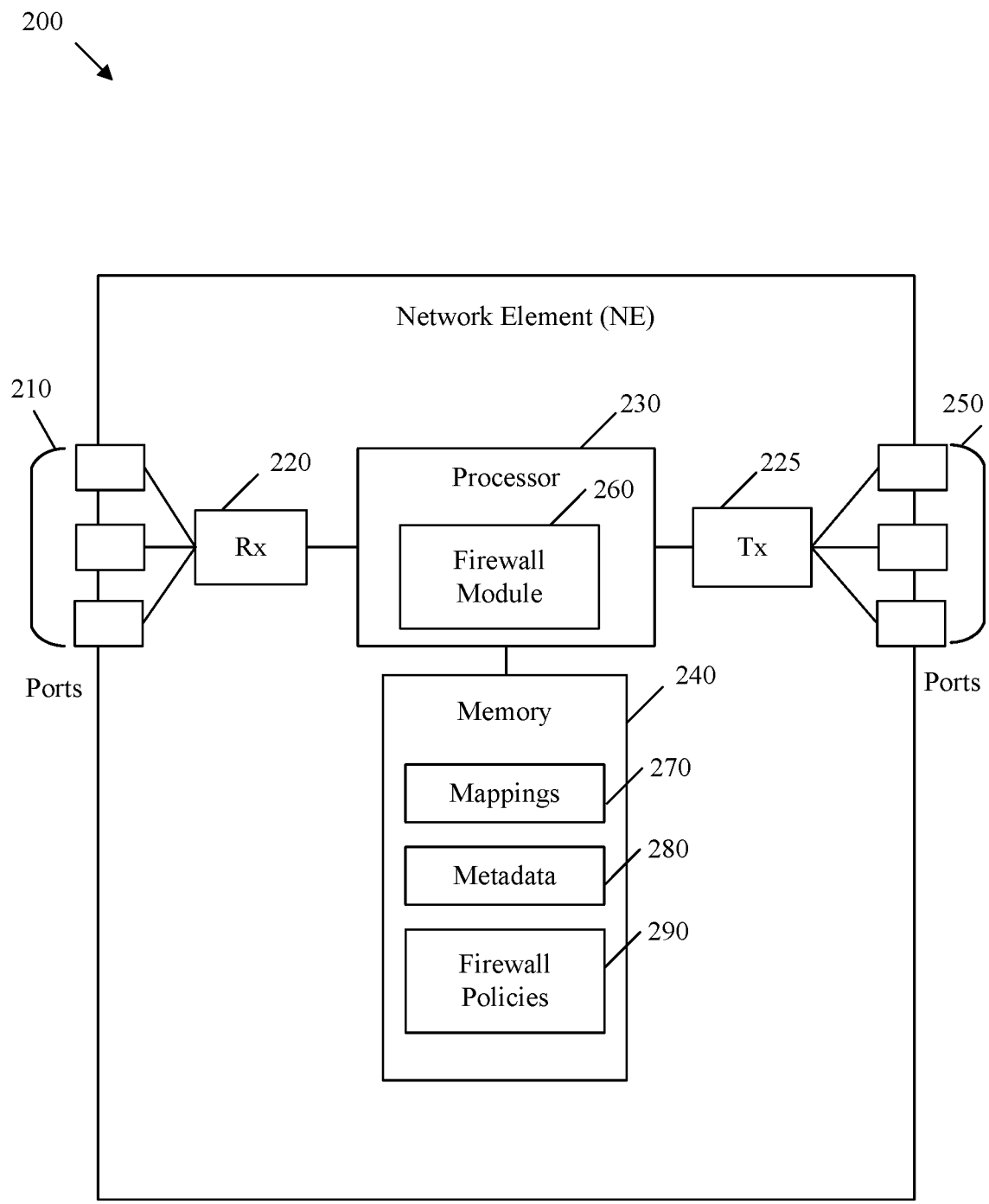
FIG. 2 is a diagram of a network element (NE) in an IEN.

FIG. 2 is a diagram of a NE 200 in an IEN. NE 200 may be similar to the distributed mapping system 130, NDs 121, 124, and 127, host entities 150 and 160, and/or firewall device 123. The NE 200 may be configured to implement and/or support the firewalling mechanisms described herein. The NE 200 may be implemented in a single node or the functionality of NE 200 may be implemented in a plurality of nodes. One skilled in the art will recognize that the term NE encompasses a broad range of devices of which NE 200 is merely an example. The NE 200 is included for purposes of clarity of discussion, but is in no way meant to limit the application of the present disclosure to a particular NE embodiment or class of NE embodiments. At least some of the features and/or methods described in the disclosure may be implemented in a network apparatus or module such as a NE 200. For instance, the features and/or methods in the disclosure may be implemented using hardware, firmware, and/or software installed to run on hardware. As shown in FIG. 2, the NE 200 comprises one or more ingress ports 210 and a receiver unit (Rx) 220 for receiving data, at least one processor, logic unit, or central processing unit (CPU) 230 to process the data, transmitter unit (Tx) 225 and one or more egress ports 250 for transmitting the data, and a memory 240 for storing the data.

The processor 230 may comprise one or more multi-core processors and be coupled to a memory 240, which may function as data stores, buffers, etc. The processor 230 may be implemented as a general processor or may be part of one or more application specific integrated circuits (ASICs) and/or digital signal processors (DSPs). The processor 230 may comprise a firewall module 260, which may perform processing functions of the host entities 150 and 160, NDs 121, 124, and 127, the distributed mapping system 130, or firewall device 123, as discussed more fully below. The firewall module 260 may also be configured to perform the steps of methods 900 and 1000, and/or any other method discussed herein. As such, the inclusion of the firewall module 260 and associated methods and systems provide improvements to the functionality of the NE 200. Further, the firewall module 260 effects a transformation of a particular article (e.g., the network) to a different state. In an alternative embodiment, firewall module 260 may be implemented as instructions stored in the memory 240, which may be executed by the processor 230.

The memory 240 may comprise a cache for temporarily storing content, e.g., a random-access memory (RAM). Additionally, the memory 240 may comprise a long-term storage for storing content relatively longer, e.g., a read-only memory (ROM). For instance, the cache and the long-term storage may include dynamic RAMs (DRAMs), solid-state drives (SSDs), hard disks, or combinations thereof. The memory 240 may be configured to store mappings 270, metadata 280, and firewall policies 290. Mappings 270 may comprise the identity-to-identifier mappings and/or identifier-to-locator mappings and/or anonymized identifier-to-locator mappings for the host entities 150 and 160 and NDs 121, 124, and 127 in the IEN 100. Metadata 280 may comprise metadata or information regarding host entities 150 and 160 and NDs 121, 124, and 127 in the IEN 100. Firewall policies 290 may comprise the firewall policies that govern how to filter packets destined for a receiving host entity 150.

When NE 200 is a receiving host entity 150, the Tx 225 transmits a firewall policy 290 to the distributed mapping system 130. The Rx 220 of the receiving host entity 150 receives data packets from a firewall device 123 when a firewall policy 290 of the receiving host entity 150 permits receiving the data packet based on a source of the data packet. In some cases, the NE 200 implemented as a receiving host entity 150 may store identifier-to-locator mappings in the mappings 270. In some cases, the NE 200 implemented as a receiving host entity 150 may not be permitted to store the identity-to-identifier in mappings 270 because such identity-to-identifier mappings may only be stored at the distributed mapping system 130.

When NE 200 is a sending host entity 160, the Tx 225 transmits a locator request to the distributed mapping system 130 to obtain a locator of a receiving host entity 150. The Rx 220 of the sending host entity 160 may receive the locator of the receiving host entity 150 when the firewall policy 290 permits the sending host entity 160 to receive the locator of the receiving host entity 150. The Tx 225 of the sending host entity 160 may transmit data packets to firewalls 123. In some cases, the NE 200 implemented as a sending host entity 160 may store identifier-to-locator mappings in the mappings 270. In some cases, the NE 200 implemented as a sending host entity 160 may not be permitted to store the identity-to-identifier in mappings 270 because such identity-to-identifier mappings may only be stored at the distributed mapping system 130.

When NE 200 is a distributed mapping system 130, a memory 240 stores the firewall policies 290 associated with various different receiving host entities 150. For example, the Rx 220 of the distributed mapping system 130 may receive the firewall policies 290 from various different receiving host entities 150. The firewall module 260 of the distributed mapping system 130 may add to the firewall policies 290 as needed, and then the Tx 225 of the distributed mapping system 130 may transmit the finalized firewall policies 290 to associated firewalls 123. In some cases, the NE 200 implemented as a distributed mapping system 130 may store identifier-to-locator mappings and identity-to-identifier mappings in the mappings 270. In some implementations, only the distributed mapping system 130 may be permitted to store the identity-to-identifier mappings in mappings 270 to better protect the identities of various host entities.

When NE 200 is a firewall device 123, the Rx 220 of the firewall device 123 may receive firewall policies 290 from the distributed mapping system 130. A memory 240 of the firewall device 123 may store the firewall policies 290 in association with an identity of the receiving host entity 150. The firewall module 260 of the firewall device 123 may be configured to determine whether to pass or drop data packets destined for the receiving host entity 150 based on the firewall policies 290 of the receiving host entity 150. For example, the firewall module 260 may block locator requests from being passed to the distributed mapping system 130 when a firewall policy 290 indicates that the sending host entity 160 is not permitted to communicate with the receiving host entity 150 identified by the locator request. The Tx 225 of the firewall device 123 may forward the data packet to the receiving host entity 150 when the firewall policy 290 of the receiving host entity permits receiving packets from a sending host entity 160. In some cases, the NE 200 implemented as a firewall device 123 may store identifier-to-locator mappings in the mappings 270. In some cases, the NE 200 implemented as a firewall device 123 may not be permitted to store the identity-to-identifier in mappings 270 because such identity-to-identifier mappings may only be stored at the distributed mapping system 130.

It is understood that by programming and/or loading executable instructions onto the NE 200, at least one of the processor 230 and/or memory 240 are changed, transforming the NE 200 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC in a particular machine or apparatus, likewise a computer that has been programmed and/or loaded with executable instructions may be viewed as a particular machine or apparatus.

Figure 3:
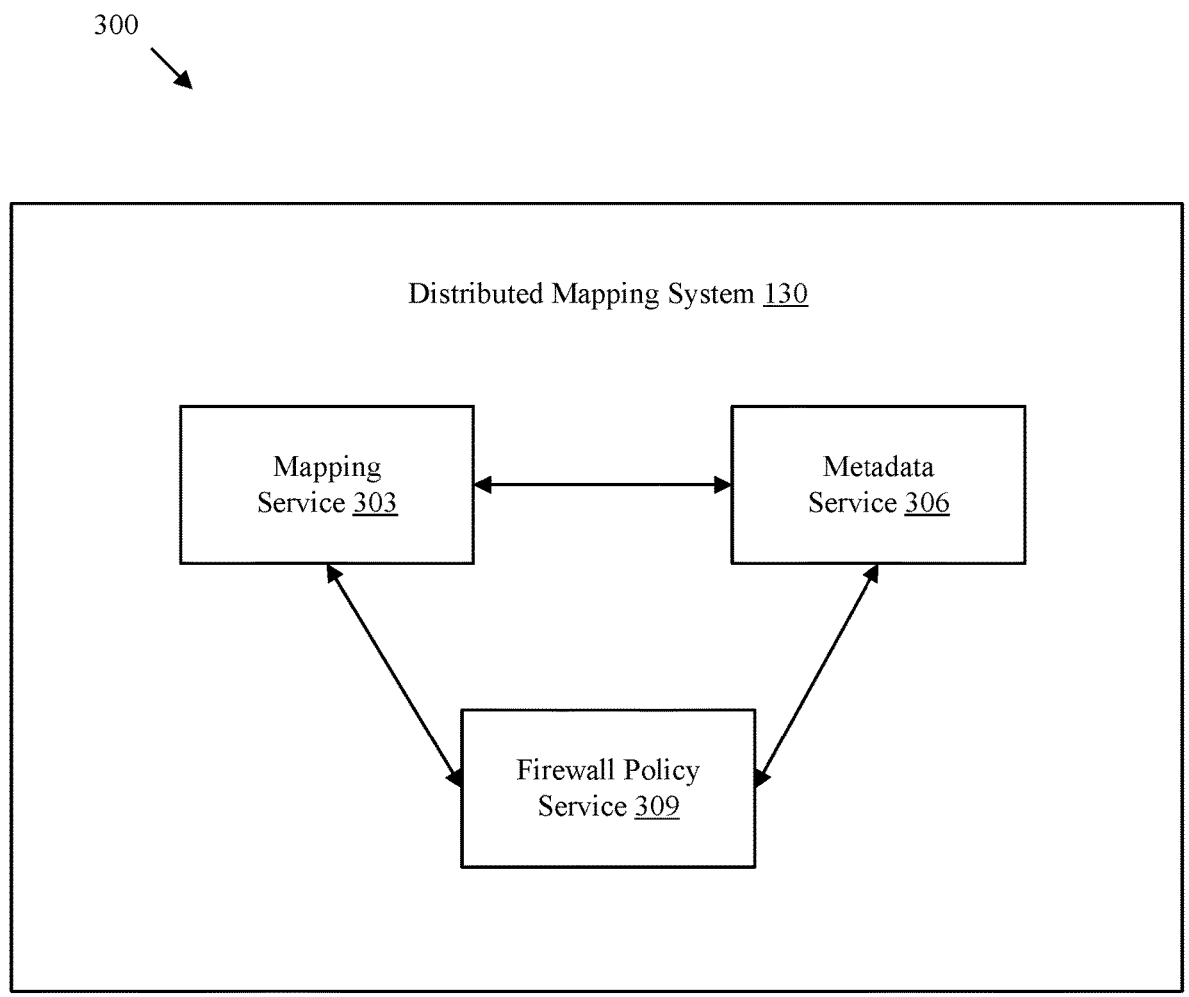
FIG. 3 illustrates an embodiment of a distributed mapping system in an IEN.

FIG. 3 illustrates an embodiment 300 of a distributed mapping system 130 in an IEN 100. The distributed mapping system 130 may implement GRIDS, such as a mapping service 303, a metadata service 306, and a firewall policy service 309. While only a mapping service 303, metadata service 306, and firewall policy service 309 are shown as the services provided by the distributed mapping system 130, it should be appreciated that the distributed mapping system 130 may be additionally configured to execute several other IEN services, such as identifier lifecycle services (to register, assign, and retire identifiers), subscription services (for example, to subscribe to updates regarding mapping data and metadata associated with a given identifier), and grouping services (for example, to group multiple identifiers of an endpoint). The distributed mapping system 130 comprises the relevant hardware and software configured to execute the mapping service 303, the metadata service 306, the firewall policy service 309, and other services that may be provided to host entities 150 and 160 in IEN 100.

The mapping service 303 is configured to register host entities 150 and 160 and NDs 121, 124, and 127 with their respective Identities IDy, U-IDs, anonymized identifiers, and locators. In an embodiment, the distributed mapping system 130 is configured to store a mapping table that maps host entities 150 and 160 with their associated U-IDs 154 and 170, anonymized identifiers, and locators. The mapping service 303 may be configured to determine a locator and an identifier for a sending host entity 160 requesting a locator for the receiving host entity 150. For example, when a sending host entity 160 sends a request to the distributed mapping system 130 for a locator associated with receiving host entity 150, the mapping service 303 is configured to determine the locator for receiving host entity 150 and, in some cases, an anonymized identifier for receiving host entity 150.

In an embodiment, the distributed mapping system 130 may also store identifiers of firewalls 123 in an IEN 100. A firewall device 123 may be implemented by an administrator of an IEN 100, and in this case, the distributed mapping system 130 may be configured to store identifiers of the firewalls 123 obtained from the administrator. In an embodiment, firewalls 123 may be configured to register with the distributed mapping system 130 in a manner similar to how host entities 150 and 160 register with the distributed mapping system 130. The distributed mapping system 130 may store a database that maps host entities 150 and 160 to associated firewalls 123. For example, a mapping may include a firewall device 123 and identities or identifiers of one or more host entities 150 or 160 that are proximate to the firewall device 123. For example, a mapping may include a firewall device 123 and identities or identifiers of one or more host entities 150 or 160 that may use the firewall device 123 as an intermediary to filter data packets destined for the host entities 150 or 160.

In an embodiment, the metadata service 306 is configured to store and update metadata associated with each of the host entities 150 and 160 and NDs 121, 124, and 127 in IEN 100. For example, when NE 200 is the distributed mapping system 130, then metadata 280 in memory 240 may store the metadata 280 associated with each of the host entities 150 and 160 and NDs 121, 124, and 127. In an embodiment, the metadata 280 comprises data identifying and describing the host entities 150 and 160. In an embodiment, the metadata 280 may contain information such as the nature of the host entities 150 and 160 or a type of device of the host entities 150 and 160. For example, the metadata 280 indicates whether the sending host entity 160 is a mobile device, a wearable device, an Internet of Things (IoT) device, or a smart vehicle.

The firewall policy service 309 may be configured to store and update firewall policies 290 associated with the various host entities 150 and 160. In an embodiment, the firewall policies 290 may be generated by a receiving host entity 150 and then sent to the distributed mapping system 130. In another embodiment, the distributed mapping system 130 may generate one or more firewall policies 290 on behalf of the receiving host entity 150. In an embodiment, the firewall policies 290 indicate how to filter data packets destined for a receiving host entity 150. The firewall policies 290 derive from identity based firewall policies 290 and metadata based firewall policies 290.

In some embodiments, the distributed mapping system 130 and the firewall device 123 may work together to implement identity based firewall policies 290 since the identity-to-identifier mappings may only be stored at the distributed mapping system. For example, suppose that a receiving host entity 150 has sent a firewall policy 290 to the distributed mapping system 130 indicating that the receiving host entity 150 should not receive any more data packets from the sending host entity 160, even though the sending host entity 160 was previously permitted to communicate with the receiving host entity 150. Subsequently, suppose that sending host entity 160 attempts to send a data packet to a receiving host entity 150 through the firewall device 123 using an identifier of the receiving host entity 150 that is already cached at the sending host entity 160 or cached at ND 127. Further, suppose that the sending host entity 160 uses a different identifier to try to communicate with the receiving host entity 150 to try to bypass the firewall device 123. In this case, the firewall device 123 may query the distributed mapping system 130 to identify whether the identity of the sending host entity 150 corresponds to one of the firewall policies 290 registered by the receiving host entity 150. If so, then the distributed mapping system 130 may instruct the firewall device 123 to block data packets from the sending host entity 160 destined for the receiving host entity 150, even though the sending host entity 160 is using a disguised identifier. In this way, the distributed mapping system 130 and the firewall device 123 implements an identity based firewall policy 290 without revealing an identity-to-identifier mappings to the firewall device 123, or any other entity in IEN 100.

In an embodiment, the identity based firewall policies 290 indicate one or more identifiers associated with sending host entities 160 that are prohibited from receiving a locator of a receiving host entity 150 and prohibited from sending data packets to a receiving host entity 150. For example, the firewall policy 290 may be a blacklist of identifiers (IDx) of different host entities that may be prohibited from communicating with the receiving host entity 150. In an embodiment, the identity based firewall policies 290 indicate one or more identifiers (IDx) associated with sending host entities 160 that are permitted to send data packets to a receiving host entity 150. For example, the firewall policy 290 may be a whitelist of identifiers (IDx) of different host entities that are the only host entities permitted to communicate with the receiving host entity 150.

In an embodiment, the identity based firewall policies 290 stored at the distributed mapping system 130 may include all possible identifiers corresponding to a single identity of a host entity. For example, suppose a receiving host entity 150 transmits a message including an identity based firewall policy 290 to the distributed mapping system 130. The message including the identity based firewall policy 290 may include a single identifier of a sending host entity host entity 160. The single identifier may be a U-ID or an anonymized identifier of the sending host entity 160. The firewall policy service 309 may obtain the identity of the sending host entity 160 corresponding to the single identifier in the message. The firewall policy service 309 may then aggregate all the identifiers corresponding to the identity of the sending host entity 160 and generate an identity based firewall policy 290 including all the identifiers corresponding to the identity of the sending host entity 160. All the identifiers corresponding to the sending host entity 160 may include fixed identifiers such as a U-ID, anonymized identifiers, public identifiers, and private identifiers of the sending host entity 160. In some embodiments, this aggregation of all the identifiers of the sending host entity 160 may be sent to the firewall 122 to implement the identity based firewall policy 290. The identity (IDy) corresponding to the sending host entity 160 may not be sent to the firewall device 123, only the identifiers (IDx) corresponding to the sending host entity 160.

In an embodiment, a metadata based firewall policy 290 includes metadata 280 associated with sending host entities 160 that are prohibited from receiving a locator of a receiving host entity 150 and prohibited from sending data packets to a receiving host entity 150. In an embodiment, a metadata based firewall policy 290 includes metadata 280 associated with sending host entities 160 that are the only sending host entities 160 that are permitted to look up the location of the receiving host entity 150 and/or send data packets to a receiving host entity 150. The metadata based firewall policy 290 may indicate how to filter data packets based on metadata 280 that describes the sending host entity 160 sending the data packets. For example, a metadata based firewall policy 290 may indicate that a receiving host entity 150 is prohibited from receiving data packets from IoT devices. In this example, the receiving host entity 150 may be a mobile device that only permits communication with other user operated devices, not IoT devices.

For example, suppose a receiving host entity 150 transmits a message including the metadata based firewall policy 290 to the distributed mapping system 130. The message including the metadata based firewall policy 290 may include one or more items of metadata 280 describing types of sending host entities 160 that are not permitted to communicate with the receiving host entity 150. In some embodiments, the firewall policy service 309 may obtain the metadata 280 describing the types of sending entities 160 that are not permitted to communicate with the receiving host entity 150 and identify similar or related metadata 280 that describe other types of sending entities 160 that also may not be permitted to communicate with the receiving host entity 150. In this way, the firewall policy service 309 may determine additional metadata based firewall policies 290 for a receiving host entity 150 based on metadata 280 describing the receiving host entity and/or firewall policies 290 that are already set for the receiving host entity 150.

In an embodiment, the firewall policy service 309 may identify groups of host entities 150 and 160 based on, for example, metadata 280 describing the host entities 150 and 160. For example, devices associated with banks may each belong to a single group. In this case, when a host entity 150 or 160 in the group generates a firewall policy 290, the firewall policy service 309 may determine whether all host entities 150 or 160 in the group may implement a similar firewall policy 290. In one embodiment, the firewall policy service 309 is configured to obtain firewall policies 290 for all host entities 150 or 160 in a group when one host entity 150 or 160 in the group sends the distributed mapping system 130 a firewall policy 290.

After generating the firewall policy 290, the firewall policy service 309 may transmit the firewall policy 290 to associated firewalls 123 within IEN 100. For example, an associated firewall device 123 may include a subset of the firewalls 123 in IEN 100 that may be configured to intercept data packets that are sent from the receiving host entity 150 to the sending host entity 160. A firewall device 123 may be an associated firewall device 123 that receives the identity based firewall policy 290 from the firewall policy service 309 when the firewall device 123 has transmitted or received a data packet from the receiving host entity 150. A firewall device 123 may be an associated firewall device 123 that receives the identity based firewall policy 290 from the firewall policy service 309 when the firewall device 123 has transmitted or received a data packet from the sending host entity 160. A firewall device 123 may be an associated firewall device 123 that receives the identity based firewall policy 290 from the firewall policy service 309 when the firewall device 123 is proximate to the receiving host entity 150 and/or the sending host entity 160. A firewall device 123 may be an associated firewall device 123 that receives the identity based firewall policy 290 from the firewall policy service 309 when the firewall device 123 frequently receives data packets from either the receiving host entity 150 or the sending host entity 160.

In an embodiment, a firewall device 123 may be an associated firewall device 123 that receives the identity based firewall policy 290 from the firewall policy service 309 for a predefined period of time. That is, a firewall device 123 may be deemed an associated firewall device 123 for only a period of time, after which the firewall device 123 may be re-instantiated as an associated firewall device 123 of a host entity 150 or 160 upon the occurrence of a predefined event. For example, the predefined event may be the receiving of a data packet from either the receiving host entity 150 or the sending host entity 160. The predefined event may also involve sending a data packet from either the receiving host entity 150 or the sending host entity 160. In this way, a number of associated firewalls 123 may be limited to prevent the distributed mapping system 130 from sending the firewall policies 290 to an unnecessarily large number of associated firewalls 123 every time a firewall policy 290 is created or updated.

An associated firewall device 123 may receive a firewall policy 290 from the firewall policy service 309 in different manners. In an embodiment, a firewall device 123 may periodically poll for new firewall policies 290 or updated firewall policies 290 associated with host entities 150 and 160. For example, suppose a receiving host entity 150 sends a firewall policy 290 to the distributed mapping system 130, and the firewall policy service 309 generates the firewall policy 290 for distribution to firewalls 123 in the IEN 100. In this embodiment, a firewall device 123 may send a request to the distributed mapping system 130 for firewall policies 290 of host entities 150 and 160 that are associated with the firewall device 123. In this embodiment, the firewall device 123 may also send a request to the distributed mapping system 130 for updates to firewall policies 290 that are locally stored at the firewall device 123. In some embodiments, the firewall device 123 may send the requests to the distributed mapping system 130 according to a predetermined schedule.

In an embodiment, a firewall device 123 may subscribe to associated host entities 150 and 160 such that the firewall policy service 309 is configured to send new firewall policies 290 for subscribed host entities 150 and 160 upon obtaining the new or updated firewall policies 290. For example, a firewall device 123 may register with the distributed mapping system 130 in a manner similar to which the host entities 150 and 160 register with the distributed mapping system 130. The firewall device 123 may subscribe to certain host entities 150 and 160 upon registration with the distributed mapping system 130. The firewall device 123 may also subscribe to host entities 150 and 160 after registration with the distributed mapping system 130. The firewall device 123 may be subscribed to host entities 150 and 160 for a period of time, for example, during which the firewall device 123 receives or sends data packets to and from the host entities 150 and 160. While the firewall device 123 is subscribed to host entities 150 and 160, the distributed mapping system 130 may be configured to automatically transmit a new or updated firewall policy 290 associated with host entities 150 and 160 every time the distributed mapping system 130 obtains new or updated firewall policies 290 associated with host entities 150 and 160.

In an embodiment, the mapping service 303, metadata service 306, and firewall policy service 309 may all be implemented centrally and co-located in one distributed mapping system 130 that is centrally available to all the routers, NDs, and host entities in the network. For example, a distributed mapping system 130 can be in a server at one operator. The distributed mapping system 130 may also be located in a cloud or one or more remote data centers. Inter provider GRIDS data may be exchanged as needed. In another embodiment, the mapping service 303, metadata service 306, and the firewall policy service 309 may be distributed throughout the network such that multiple processors 230 and memories 240 are used separately to implement the functions of the mapping service 303, metadata service 306, and the firewall policy service 309.

Figure 4:

FIG. 4 is a diagram illustrating the information 400 that distributed mapping system 130 maintains to provide the mapping service 303, metadata service 306, and firewall policy service 309 to host entities 150 and 160. In an embodiment, firewall device 123 may also maintain information 400 locally to implement the firewall policies 290 for receiving host entities 150. While the information 400 is shown in a format using a single table, it should be understood that FIG. 4 illustrates an abstraction of how information 400 may be stored at one or more distributed mapping systems 130 and/or firewalls 123. It should be appreciated that information 400 may be stored in any format or manner according to different database schema, and information 400 may be stored in a single table or database or multiple different tables or databases. For example, one table or database may include identifier-to-locator mappings and another table may include other information not including the identifier-to-locator mappings.

The distributed mapping system 130 may store the information 400 associated with multiple host entities 150 and 160, where each host entity is associated with an identity 403 and 406, respectively. The firewall device 123 may also store the information 400 describing multiple associated host entities 150 and 160. However, the firewall device 123 may not be permitted to store the identity (IDy) 403 of the sending host entity 160 and the identity (IDy) 406 of the receiving host entity 150 because, as described above, only the distributed mapping system 130 may be configured to store the identities (IDys) 403 and 406. The identity 403 corresponds to the sending host entity 160, and the identity 406 corresponds to the receiving host entity 150. The identities 403 and 406 may be private identifiers that reference host entities 150 and 160, respectively. The identities 403 and 406 may not be shared with other host entities or used on the data plane. The identities 403 and 406 of host entities 150 or 160, respectively, may be private so that only the distributed mapping system 130 may obtain identities 403 and 406.

In an embodiment, each identity 403 and 406 is associated with multiple identifiers, which may be a U-ID and/or anonymized identifiers. Each of the identifiers may be associated, or used with, different locators. Therefore, each identifier may be mapped to a locator to create an identifier-to-locator mapping 409 and 411. Each identity 403 and 406 is associated with multiple identifier-to-locator mappings 409 and 411, respectively. For example, the sending host entity 160 may be associated with an anonymized identifier (AID1) when the sending host entity 160 is attached to ND 121 having a locator (LOC 148), resulting in an identifier-to-locator mapping of AID1-to-LOC 148. Similarly, the sending host entity 160 may be associated with a different anonymized identifier (AID2) when the sending host entity 160 is attached to ND 127 having another locator (LOC 145), resulting in an identifier-to-locator mapping of AID2-to-LOC 145. In this example, the identifier-to-locator mappings 409 for the sending host entity 160 may include both AID1-to-LOC 148 and AID2-to-LOC 145. The identifier-to-locator mappings 411 for the receiving host entity 150 may include similar mappings of identifiers and locators that have previously been associated with the receiving host entity 150.

In an embodiment, each identity 403 and 406 is also associated with metadata 413 and 415. Metadata 413 may be metadata identifying and/or describing the sending host entity 160, and the metadata 415 may be metadata identifying and/or describing the receiving host entity 150. For example, the metadata 413 and 415 may identify a type of host entity 150 or 160, a location of the host entity 150 or 160, a history of communications performed by the host entity 150 or 160, and/or any information that may be associated with a host entity 150 or 160. In an embodiment, the metadata 413 and 415 may be stored and regulated according to whether the metadata is public metadata or private metadata. Public metadata is accessible to other NDS and other host entities. Private metadata is only accessible to the associated host entity that the private metadata is associated with.

In some embodiments, information 400 may also include firewall policies 290 corresponding to the identities 403 and 406 of the host entities 160 and 150, respectively. As shown in FIG. 4, information 400 includes the identity based firewall policies 418 set by the sending host entity 160, which is stored in association with the identity 403 of the sending host entity 160. Similarly, information 400 includes the identity based firewall policies 421 set by the receiving host entity 160, which is stored in association with the identity 406 of the receiving host entity 150. In some embodiments, the firewall device 123 locally stores the identity based firewall policies 418 and 421 in association with identities 403 and 406 corresponding to the sending host entity 160 and the receiving host entity 150.

As shown in FIG. 4, information 400 includes the metadata based firewall policies 424 set by the sending host entity 160, which is stored in association with the identity 403 of the sending host entity 160. Similarly, information 400 includes the metadata based firewall policies 427 set by the receiving host entity 160, which is stored in association with the identity 406 of the receiving host entity 150. In some embodiments, the firewall device 123 locally stores the metadata based firewall policies 424 and 427 in association with identities 403 and 406 corresponding to the sending host entity 160 and the receiving host entity 150

While FIG. 4 only shows one identifier-to-locator mapping 409, one metadata 413, one identity based firewall policy 418, and one metadata based firewall policy 424 in association with the identity 403 of the sending host entity 160, it should be appreciated that information 400 includes any number of identifier-to-locator mappings 409, metadata 413, identity based firewall policies 418, and metadata based firewall policies 424 in association with the identity 403 of the sending host entity 160. Similarly, it should be appreciated that information 400 includes any number of identifier-to-locator mappings 411, metadata 415, identity based firewall policies 421, and metadata based firewall policies 427 in association with the identity 406 of the receiving host entity 150.

Figure 5:
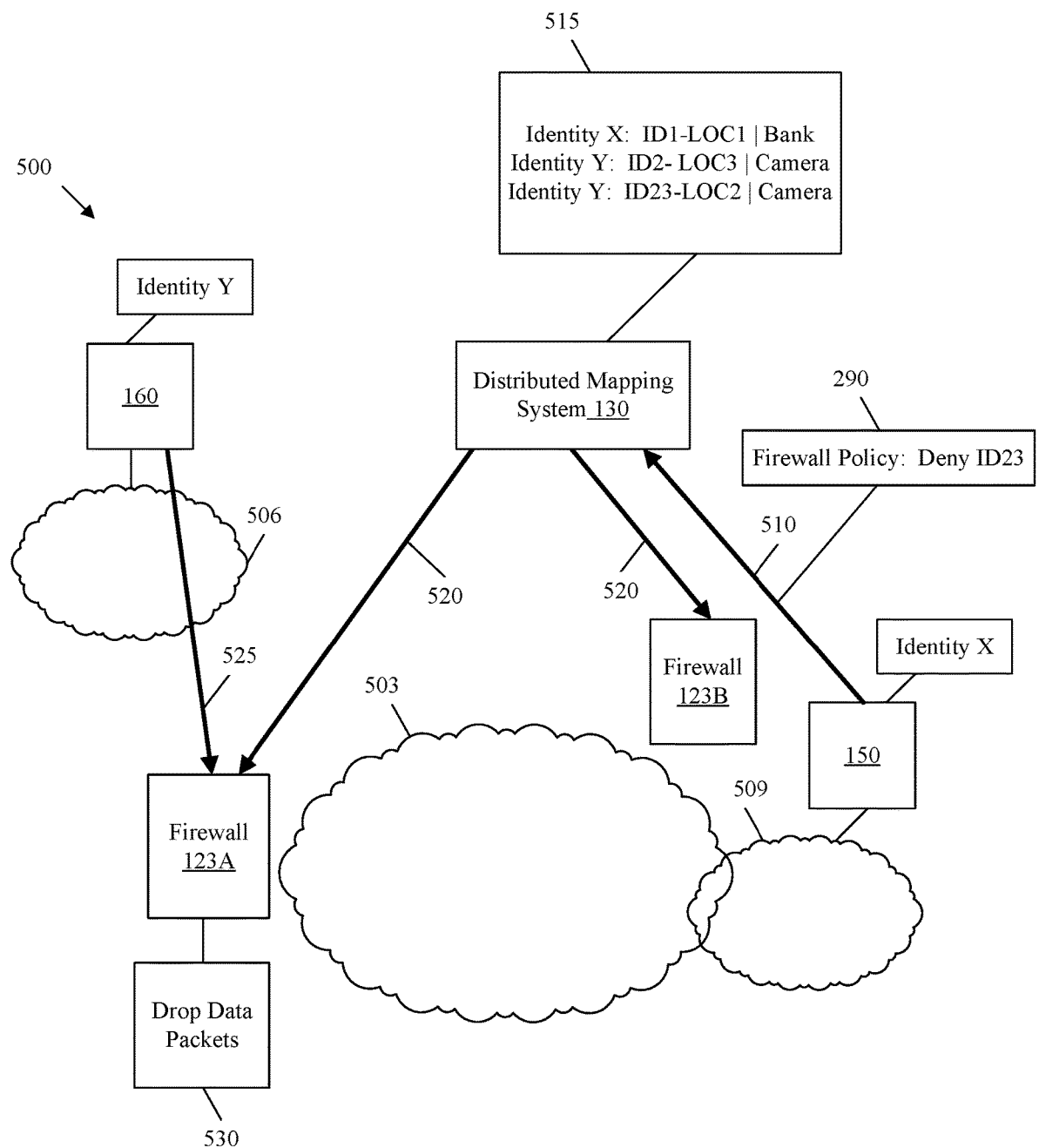
FIG. 5 illustrates a method of registering and implementing a firewall policy in an IEN according to an embodiment of the disclosure.

FIG. 5 illustrates a method of registering and implementing a firewall policy 290 in an IEN 500 according to an embodiment of the disclosure. The method shown in FIG. 5 illustrates an identity based firewall policy 290. IEN 500 is similar to IEN 100 except that IEN 500 shows a backbone network 503, a local network 506 proximate to sending host entity 160, and a local network 509 proximate to the receiving host entity 150. In an embodiment, the backbone network 503 may be a packet switched network or a packet optical network that connects the local network 506 and the local network 509. The backbone network 503 may also connect host entities 150 and 160 to service providers and other systems, such as the external Internet, other cloud computing systems, data centers, and any other entity. The local network 506 may be a network, such as a wide area network (WAN) or a local area network (LAN), which is connected to the sending host entity 160 or ND 127. Similarly, the local network 509 may be a network, such as a WAN or LAN, which is connected to the receiving host entity 150 or ND 121.

At step 510, the receiving host entity 150, or ND 121 acting on behalf of the receiving host entity 150, transmits a firewall policy 290 to the distributed mapping system 130. The firewall policy 290 shown in FIG. 5 is an identity based firewall policy 290 indicating that firewalls 123 should be configured to prevent sending host entities 160 having an identifier of "ID23" from being able to receive a locator of the receiving host entity 150. The identity based firewall policy 290 may also indicate that firewalls 123 should be configured to drop data packets including a source identifier of "ID23" from being transmitted to the receiving host entity 150.

In an embodiment, the distributed mapping system 130 may store the information shown in box 515. As shown in box 515, a host entity having the identity of "X" may have, for example, one identifier-to-locator mapping, and metadata 280 identifying the host entity as being a device of a bank. Box 515 also shows another host entity having the identity of "Y," which may have, for example, two identifier-to-locator mappings, and metadata 280 identifying the other host entity as being a camera. Suppose the receiving host entity 150 has the identity "X" and the sending host entity 160 has the identity "Y." In this example, the firewall policy 290 sent by the receiving host entity 150 indicates that a sending host entity 160 behind "ID23" is not permitted to receive a locator of the receiving host entity 150 and/or data packets from the sending host entity 160 behind "ID23" should be blocked before being received by the receiving host entity 150. In an embodiment, the firewall policy service 309 may determine, for example, based on the information stored in box 515, that identity "Y" corresponds to "ID23," and identity "Y" corresponds to the sending host entity 160. In this embodiment, the firewall policy service 309 may obtain an identity based firewall policy 290 indicating that all the identifiers corresponding to identity "Y" should be blocked. For example, "ID2" also corresponds to the identity "Y," and thus, the firewall policy service 309 may be configured to create a firewall policy 290 blocking data packets with a source identifier of "ID23," "ID2," and all other identifiers that may correspond to the sending host entity 160 behind identity "Y."

At step 520, the distributed mapping system 130 transmits the identity based firewall policy 290 indicating that all identifiers corresponding to identity "Y" should be blocked to firewalls 123A and 123B, without actually sending the identity "Y" to the firewalls 123A and B. As shown in FIG. 5, the identity based firewall policy 290 is sent to two firewalls 123A and 123B because firewalls 123A and 123B are associated to the sending host entity 160 and/or the receiving host entity 150. Firewall device 123A is located proximate to the sending host entity 160 on one side of the backbone network 503. Firewall device 123B is located proximate to the receiving host entity 150 on the other side of the backbone network 503.

In an embodiment, the firewalls 123A and 123B are both configured to locally store the identity based firewall policy 290. For example, the identity based firewall policy 290 may be stored in a manner similar to that which is shown in FIG. 4, without storing the identities 403 and 406 that are only permitted to be stored at the distributed mapping system 130. For example, the firewalls 123A and 123B are both configured to locally store the identifiers that may correspond to the sending host entity 160 behind identity "Y" based on the identity based firewall policy 290. In this way, when a locator request for the receiving host entity 150 is received from a sending host entity 160 having any of the identifiers received from the distributed mapping system 130, the firewalls 123A and 123B may be configured to prevent the locator request from being transmitted to the distributed mapping system 130. The firewalls 123A and 123B also prevent the sending host entity 160 from receiving the locator of the receiving host entity 150. In addition, when a data packet is received at either the firewall device 123A or 123B, the source identifier field of the data packet may be inspected to determine whether the identifier in the field matches any of the identifiers locally stored at the identity based firewall policy 290.

Subsequently, the sending host entity 160 may begin transmission of data packets to the receiving host entity 150 when then sending host entity 160 stores the current locator of the receiving host entity 150. At step 525, the sending host entity 160 transmits a data packet with a source identifier field including an identifier such as, "ID23," of the sending host entity 160. As shown by the step representing step 525, the data packet is transmitted through the local network 506 to the firewall device 123A.

In an embodiment, the firewall device 123A receives the data packet from the sending host entity 160 or the ND 127 acting on behalf of the sending host entity 160. In an embodiment, the firewall module 260 executed by firewall device 123A is configured to determine whether a source identifier in the source identifier field matches an identifier included in the identity based firewall policy 290. When the source identifier in the source identifier field matches an identifier included in the identity based firewall policy 290, the firewall device 123A is configured to drop the data packet, as shown in box 530. When the source identifier in the source identifier field matches an identifier included in the identity based firewall policy 290, the firewall device 123A is configured to pass the data packet to either firewall device 123B, ND 121, or the receiving host entity 150. In an embodiment in which the firewall policy 290 includes a whitelist of permitted source identifiers, then the firewall device 123A is configured to continue transmitting the data packet to the receiving host entity 150 only if the source identifier matches an identifier in the whitelist.

As shown in FIG. 5, a data packet having a source identifier matching an identifier included in the identity based firewall policy 290 does not have to traverse through the backbone network 503 before being dropped. In this way, a to-be dropped data packet is discarded closer to the source of the data packet transmission. This is in contrast to the traditional methods of firewalling in which a to-be dropped data packet is discarded closer to the destination of the data packet transmission. Therefore, the embodiments disclosed herein enable a more efficient usage of the resources in IEN 500 while preventing the unnecessary clogging on network resources in IEN 500.

Figure 6:
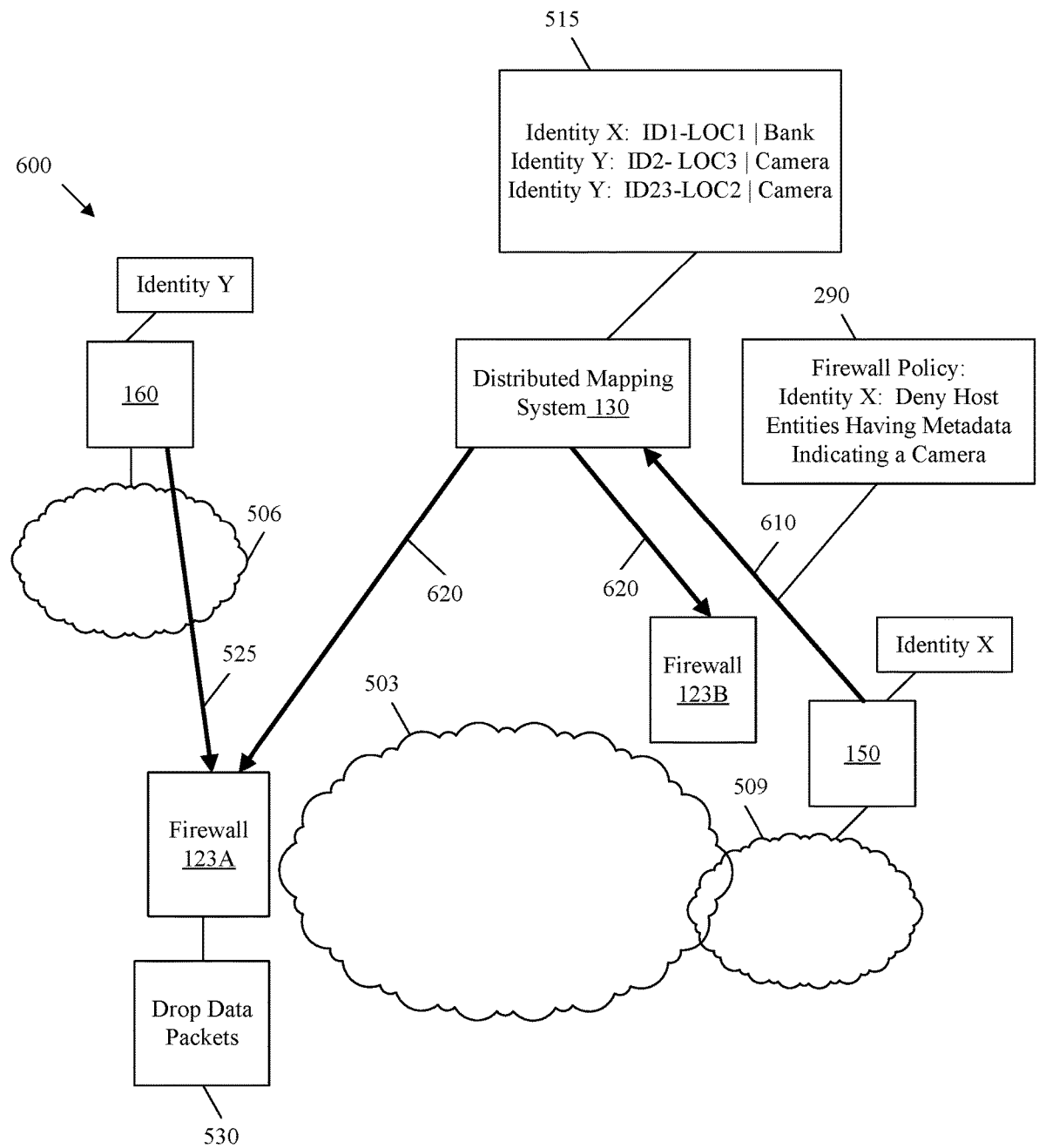
FIG. 6 illustrates another method of registering and implementing a firewall policy in an IEN according to an embodiment of the disclosure.

FIG. 6 illustrates another method of registering and implementing a firewall policy 290 in an IEN 600 according to an embodiment of the disclosure. The method shown in FIG. 6 is similar to the method shown in FIG. 5, except that the method shown in FIG. 6 illustrates a metadata based firewall policy 290. Similar to step 510 of FIG. 5, at step 610, the receiving host entity 150, or ND 121 acting on behalf of the receiving host entity 150, transmits a firewall policy 290 to the distributed mapping system 130. The firewall policy 290 shown in FIG. 6 is a metadata based firewall policy 290 indicating that one or more firewalls 123 should be configured to drop data packets destined for the receiving host entity 160, where the data packet includes a source identifier that is associated with a host entity having an item of metadata 280 indicating that the host entity is a "camera."

Similar to FIG. 5, box 515 shows information that may be stored at the distributed mapping system 130. Suppose the receiving host entity 150 has the identity "X" and the sending host entity 160 has the identity "Y." In this example, the firewall policy 290 sent by the receiving host entity 150 indicates that data packets from cameras should be blocked before being sent to the receiving host entity 150. In an embodiment, the firewall policy service 309 may determine, for example, based on the information stored in box 515, that identity "X" corresponds to a bank, and therefore, other devices that do not normally correspond to a bank should also be blocked from sending data packets to the bank. In this case, the firewall policy service 309 may be configured to create a firewall policy 290 blocking all data packets that have source identifiers (IDxs) that correspond to metadata 280 that identifies the source of the packet as being prohibited from sending data packets to the bank.

Similar to step 520 of FIG. 5, at step 620, the distributed mapping system 130 transmits the metadata based firewall policy 290 instructing a firewall device 123 to prevent host entities 150 or 160 having a metadata 280 indicating that the host entity 150 or 160 is a camera from receiving a locator and to block data packets from host entities 150 or 160 having a metadata 280 indicating that the host entity 150 or 160 is a camera. As shown in FIG. 5, the identity based firewall policy 290 is sent to two firewalls 123A and 123B because firewalls 123A and 123B are associated to the sending host entity 160 and/or the receiving host entity 151. The firewalls 123A and 123B are both configured to locally store the metadata based firewall policy 290 in a manner similar to that which is shown in FIG. 4.

Subsequently, the sending host entity 160 transmits a data packet with a source identifier field including an identifier of the sending host entity 160 at step 525. The source identifier may correspond to a metadata 280 that identifies or describes the sending host entity 160. For example, the firewalls 123A and 123B may store information in a manner similar to that shown in FIG. 4, in which the metadata 280 is stored in association with the identifiers used to identify the sending host entity 160. In this way, the firewalls 123A and 123B may obtain the metadata 280 for the source identifier received in the data packet. When the metadata 280 corresponding to the source identifier indicates that the sending host entity 160 includes a camera, the firewall device 123A is configured to drop the data packet, as shown in box 530.

Figure 7:
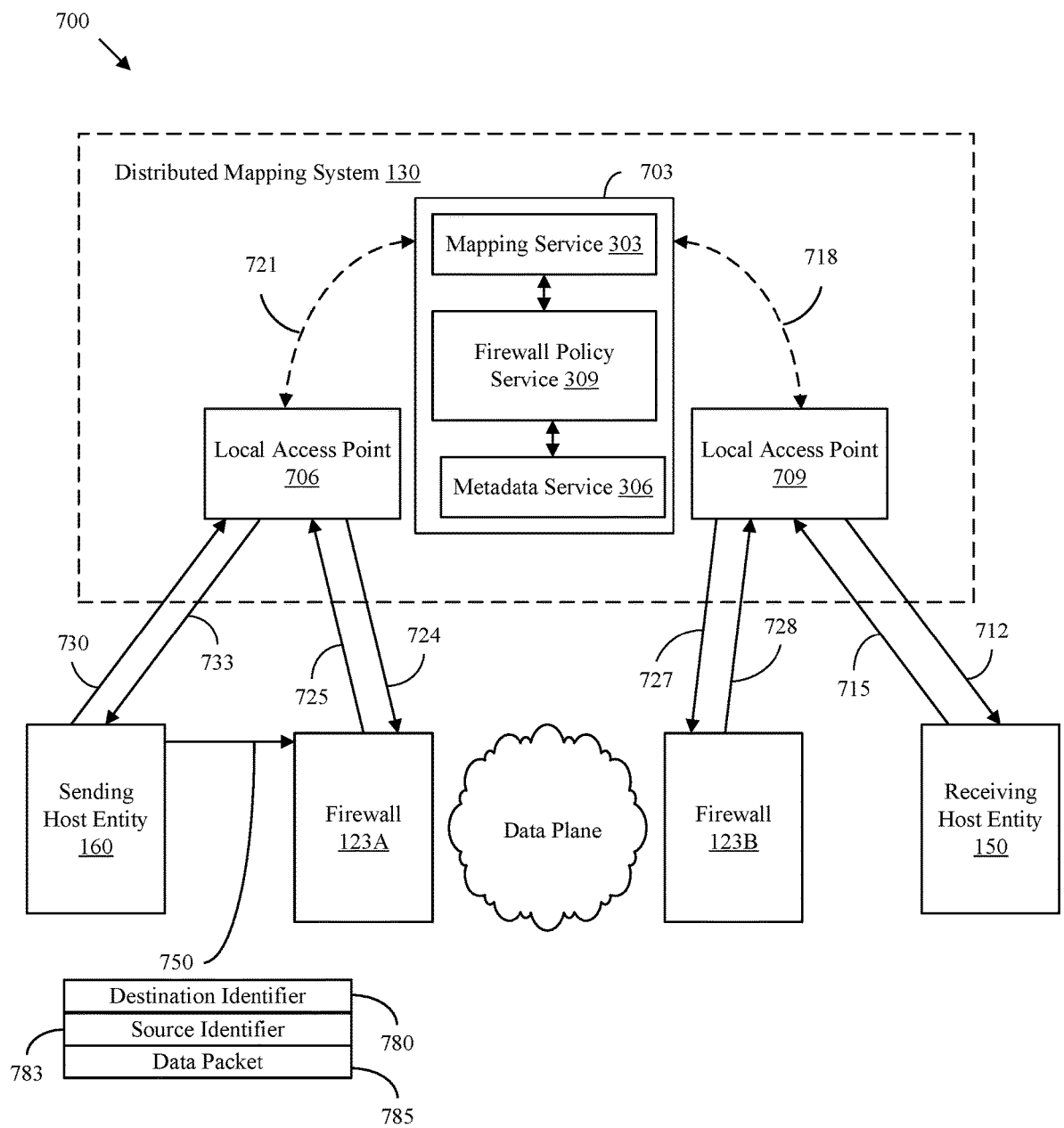
FIG. 7 illustrates another method of registering and implementing a firewall policy in an IEN according to an embodiment of the disclosure.

FIG. 7 illustrates another method of registering and implementing a firewall policy 290 in an IEN 700 according to an embodiment of the disclosure. For example, IEN 700 is similar to IENs 100, 500, and 600. The embodiment of the IEN 700 shown in FIG. 7 implements a host based communication scheme, such as HIP, where host entities 150 and 160 can communicate directly with the distributed mapping system 130 without the use of NDs 121 and 127.

As shown FIG. 7, IEN 700 includes the distributed mapping system 130, the receiving host entity 150, and the sending host entity 160. The distributed mapping system 130 includes a local access point 706 and a local access point 709. Local access point 706 may be located proximate to the sending host entity 160 such that the local access point 706 serves the sending host entity 160. Similarly, local access point 709 may be located proximate to the receiving host entity 150 such that the local access point 709 serves the receiving host entity 150. The local access points 706 and 709 may be NEs similar to NE 200 that accesses the GRIDS shown in FIG. 3. The local access points 706 and 706 each communicate and synchronize with a global system 703 that may include the mapping service 303, metadata service 306, and the firewall policy service 309. The global system 703 may synchronize and consolidate information received from both the local access points 706 and 706. While only two host entities 150 and 160, two firewalls 123A and 123B, and two local access points 706 and 709 are shown in FIG. 7, it should be appreciated that any number of host entities and local access points may be part of IEN 700.

At step 712, the receiving host entity 150 sends a message including one or more firewall policies 290 to the local access point 709 of the distributed mapping system 130. For example, Tx 225 of the receiving host entity 150 sends the message including the firewall policies 290 to the local access point 709. In an embodiment, the firewall policies 290 may include identity based firewall policies 290 and/or metadata based firewall policies 290. When the message includes identity based firewall policies 290, the message may include at least one identifier of one or more sending host entities 160 that are prohibited from transmitting data packets to the receiving host entity 150. The message may also include identifiers of one or more sending host entities 160 that are the only host entities permitted to transmit data packets to the receiving host entity 150. When the message includes metadata based firewall policies 290, the message may include identification of metadata 280 that identifies or describes one or more sending host entities 160 that are prohibited to transmit data packets to the receiving host entity 150. The message may also include identification of metadata 280 that identifies or describes one or more sending host entities 160 that are the only host entities permitted to transmit data packets to the receiving host entity 150.

In an embodiment, the message may be sent when the receiving host entity 150 is registering or updating a current locator of host entity 150 with the distributed mapping system 130. In this embodiment, the message may further include a U-ID of the receiving host entity 150, a current locator of the receiving host entity 150, and the firewall policies 290 of the receiving host entity 150. In some embodiments, the message may be sent by the receiving host entity 150 at any time regardless of whether the receiving host entity 150 is changing locations.

In some embodiments, the message with the firewall policies 290 may be sent in a tuple format including an identifier of a receiving host entity 150 and firewall policies 290. For example, the message sent at step 712 may include a tuple as follows: (the identifier of the receiving host entity 150, firewall policies 290 of the receiving host entity 150). As described above, the message sent at step 712 may include other information aside from an identifier of the receiving host entity 150 and the firewall policies 290. The message may comprise new firewall policies 290 or updates to existing firewall policies 290 for the receiving host entity 150.

At step 715, a response is sent from the local access point 709 to the receiving host entity 150 after the local access point 709 receives the message with the firewall policies 290. For example, a Tx 225 of the local access point 709 transmits the response to the receiving host entity 150. The response may be an acknowledgement (ACK) or a negative acknowledgement (NACK) that indicates whether the local access point 709 successfully received the message and firewall policies 290 from the receiving host entity 150. The response may also include other information related to the processing of the message sent by the receiving host entity 150.

At step 718, the local access point 709 may send the firewall policies 290 received in the message from the receiving host entity 150 to the global system 703 to synchronize with the global system 703. For example, a Tx 225 of the local access point 709 sends the firewall policies 290 from the message to the global system 703. The firewall policy service 309 at the global system 703 may store the firewall policies 290 in association with the identity of the receiving host entity 150 in a manner similar to that described with reference to FIG. 4. The firewall policy service 309 may also add additional identities, identifiers, and/or metadata 280 to the firewall policies 290 based on metadata 280 of the receiving host entity 150, previous firewall policies 290 set by the receiving host entity 150, a history of common types of firewall policies 290 for host entities in IEN 700, groups of host entities, and/or unusual behavior detected at one or more host entities within IEN 700.

After the firewall policy service 309 has completed obtaining and adding to the firewall policies 290 received from the receiving host entity 150 and stored at the distributed mapping system 130, the firewall policy service 309 may transmit the firewall policies 290 to one or more associated firewalls 123A and 123B in IEN 700. For example, a Tx 225 of the global system 703 sends the firewall policies 290 to the local access point 706. At step 724, the local access point 706 sends the firewall policies 290 to the firewall device 123A. For example, a Tx 225 of the local access point 706 sends the firewall policies 290 to the firewall device 123A. Similarly, Tx 225 of the global system 703 sends the firewall policies 290 to the local access point 709. At step 727, the local access point 709 sends the firewall policies 290 to the firewall device 123B. For example, a Tx 225 of the local access point 709 sends the firewall policies 290 to the firewall device 123B. While only two associated firewalls 123A and 123B are shown in IEN 700, it should be appreciated that any number of firewalls 123 may be included in IEN 700 as being associated with the sending host entity 160 and/or the receiving host entity 150.

After receiving the firewall policies 290 from the distributed mapping system 130, the firewalls 123A and 123B may be configured to store the firewall policies 290 in a manner similar to that which is shown in FIG. 4. For example, a memory 240 of the firewalls 123A and 123B stores the firewall policies 290 received from the distributed mapping system 130. In an embodiment in which the receiving host entity 150 had sent an update to an existing firewall policy 290 at step 712, the firewalls 123A and 123B also receive the update to the existing firewall policy 290. The firewalls 123A and 123B may be configured to locally update the corresponding stored firewall policies 290 according to the update that was received by the distributed mapping system 130.

In one embodiment, the firewalls 123A and 123B send requests for new and updated firewall policies 290 periodically or at will. At step 725, firewall device 123A may transmit a request for new and updated firewall policies 290. For example, Tx 225 of firewall device 123A transmits the request for new and updated firewall policies 290. Similarly, at step 728, firewall device 123B may transmit a request for new and updated firewall policies 290. For example, Tx 225 of firewall device 123B transmits the request for new and updated firewall policies 290. In one embodiment, the firewalls 123A and 12B receive the new and updated firewall policies 290 from the distributed mapping system 130 according to a predetermined schedule without having to request the new and updated firewall policies 290.

At this point, both firewalls 123A and 123B are configured to implement the firewall policies 290 received from the receiving host entity 150. In an embodiment, the firewalls 123A and 123B are configured to receive data packets after they are transmitted from a source (e.g., sending host entity 160) and/or before they are received by a destination (e.g., receiving host entity 150). The firewalls 123A and 123B may be configured to implement firewall policies 290 when a data packet is received that is destined for the receiving host entity 150.

Subsequently, at step 730, the sending host entity 160 sends a message including a locator request to the local access point 706. For example, a Tx 225 of the sending host entity 160 sends the message including the locator request to the local access point 706. In an embodiment, the message including the locator request may be sent after the sending host entity 160 and the receiving host entity 150 registers with the distributed mapping system 130. The locator request may be a request for a current locator of the receiving host entity 150 to enable the sending host entity 160 to send data traffic to the receiving host entity 150 at the correct location. For example, the locator request may include the U-ID or an anonymized identifier of the receiving host entity 150 in response to the sending host entity 160 previously obtaining the U-ID or an anonymized identifier of the receiving host entity 150. In an embodiment, the locator request may be a new message that the sending host entity 160 sends to the local access point 709. In an embodiment, the locator request may be a pre-existing message for HIP as defined in RFC 7401.

In an embodiment, at step 721, the local access point 706 may again synchronize or communicate with the global system 703 to determine the current locator of the receiving host entity 150 after receiving the locator request from the sending host entity 160. Once the mapping service 303 determines the current locator of the receiving host entity 150 based on the identifier included in the locator request, the firewall policy service 309 may determine whether the sending host entity 160 is permitted to receive the locator based on firewall policies 290 of the receiving host entity 150. For example, the firewall module 260 of the distributed mapping system 130 may determine whether the sending host entity 160 is permitted to receive the locator of the receiving host entity 150 based on firewall policies 290 of the receiving host entity 150.

If the receiving host entity 150 does not have a firewall policy 209 that prohibits the sending host entity 160 from communicating with the receiving host entity 150, then the mapping service 303 may advertise the locator of the receiving host entity 150 corresponding to the identifier in the locator request. At step 733, the local access point 706 transmits the locator to the sending host entity 160. For example, Tx 225 of the local access point 706 transmits the locator to the sending host entity 160.

If the receiving host entity 150 does have a firewall policy 290 that prohibits the sending host entity 160 from communicating with the receiving host entity 150, then distributed mapping system 130 may determine that the locator of the receiving host entity 150 is not permitted to be transmitted to the sending host entity 160. In this case, at step 733, a message indicating that the locator of the receiving host entity 150 is not permitted to be transmitted to the sending host entity 160 may be sent to the sending host entity 160. For example, Tx 225 of the local access point 706 transmits the message to the sending host entity 160.

In an embodiment, at step 730, the sending host entity 160 may send a message including the locator request to the firewall device 123A instead of the local access point 706. For example, a Tx 225 of the sending host entity 160 sends the message including the locator request to the local access point 706. The firewall device 123A may access the locally stored firewall policies to determine whether the sending host entity 160 is permitted to receive the locator of the receiving host entity 150. When the sending host entity 160 is not permitted to receive the locator of the receiving host entity 150, at step 733, a message indicating that the locator of the receiving host entity 150 is not permitted to be transmitted to the sending host entity 160 may be sent to the sending host entity 160. When the sending host entity 160 is permitted to receive the locator of the receiving host entity 150, at step 733, the firewall device 123A may advertise the locator of the receiving host entity 150 corresponding to the identifier in the locator request.

In some embodiments, the sending host entity 160 may already store the current locator for the receiving host entity 150. For example, after the sending host entity 160 receives the current locator for the receiving host entity 150 at step 733, the sending host entity 160 may store the current locator for the receiving host entity 150. At some point after the sending host entity 160 stores the current locator of the receiving host entity 150, the firewalls 123A and 123B may be updated to drop data packets originating from the sending host entity 160 and destined for the receiving host entity 150. This may occur when, for example, the firewall policy service 309 detects unusual behavior at the sending host entity 160 or a new firewall policy 290 is created that prohibits the sending host entity 160 from communicating with the receiving host entity 150. For example, the unusual behavior may occur when the sending host entity 160 sends a large amount of messages to the receiving host entity 150 for no reason, or when the sending host entity 160 is engaging in activity that is illegal or otherwise unusual for the sending host entity 160. In another example, the receiving host entity 150 may send a new firewall policy 290 to the distributed mapping system 130 indicating that any identifier corresponding to the sending host entity 160 should no longer be permitted to communicate with the receiving host entity 150.

Suppose the sending host entity 160 already stores the current locator for the receiving host entity 150. At step 750, the sending host entity 160 begins to send data packets 785 to the receiving host entity 150 through the firewalls 123A and/or 123B even though the receiving host entity 150 has initiated a firewall policy 290 rejecting data packets from the sending host entity 160. For example, Tx 225 of the sending host entity 160 may transmit data packets 785 to the receiving host entity 150. A destination identifier field 780 of the data packet 785 includes an identifier of the receiving host entity 150, and source identifier field 783 of the data packet 785 includes an identifier of the sending host entity 160. The identifier of the receiving host entity 150 and the identifier of the sending host entity 160 may be U-IDs or anonymized identifiers based on whether the receiving host entity 150 and the sending host entity 160 prefer to be anonymized. In an embodiment in which IEN 700 implements IP version 4 (IPv4) or IP version 6 (IPv6), the data packets 785 may include an outer IP header. The outer IP header may include a source IP address field and a destination IP address field.

For the data packets 785 that are sent at step 750, the source IP address field may include the IP address of the sending host entity 160 and the destination IP address field may include the locator of the receiving host entity 150. In this case, the locator of the receiving host entity 150 may be an IP address.

When the firewall device 123A receives the data packet 785 from the sending host entity 160, the firewall device 123A determines whether to drop the data packet 785 or continue transmission of the data packet 785 to the receiving host entity 150. For example, the firewall module 260 of the firewall device 123A may determine whether the identifier included in the locator request matches an identifier in an identity based firewall policy 290 of the receiving host entity 150. The firewall module 260 may discard the data packet 785 to prohibit the data packet 785 from being sent to the receiving host entity 150 based on the identity based firewall policy 290. The firewall module 260 may determine to continue transmission of the data packet 785 to the receiving host entity 150 based on the identity based firewall policy 290. In some embodiments, a first data packet 785 of a data flow from a sending host entity 160 may be inspected by the firewall module 260 of firewall device 123A to retrieve the identifier (IDf) of the sending host entity 160. When the retrieved identifier (IDf) does not correspond to any of the identifiers (IDf) stored locally in association with the identity based firewall policy, the firewall device 123 may send the retrieved identifier (IDf) to the distributed mapping system 130 so that the distributed mapping system 130 may determine whether the retrieved identifier (IDf) corresponds to an identity (IDy) of a blocked sending host entity 160 identified in the identity based firewall policy 290. In this case, the distributed mapping system 130 may transmit the retrieved identifier (IDf) back to firewall device 123A with an indication that this retrieved identifier (IDf) corresponds to a blocked sending host entity 160, and that all subsequent data packets 785 of the data flow from the sending host entity 160 should be blocked at the firewall device 123A.

For example, the firewall module 260 of the firewall device 123A may determine whether metadata 280 of the sending host entity 160 matches metadata 280 included in a metadata based firewall policy 290 of the receiving host entity 150. The firewall module 260 may determine to discard the data packet 785 to prohibit the data packet 785 from being sent to the receiving host entity 150 based on the metadata based firewall policy 290. The firewall module 260 may determine to continue transmission of the data packet 785 to the receiving host entity 150 based on the metadata based firewall policy 290.

Figure 8:
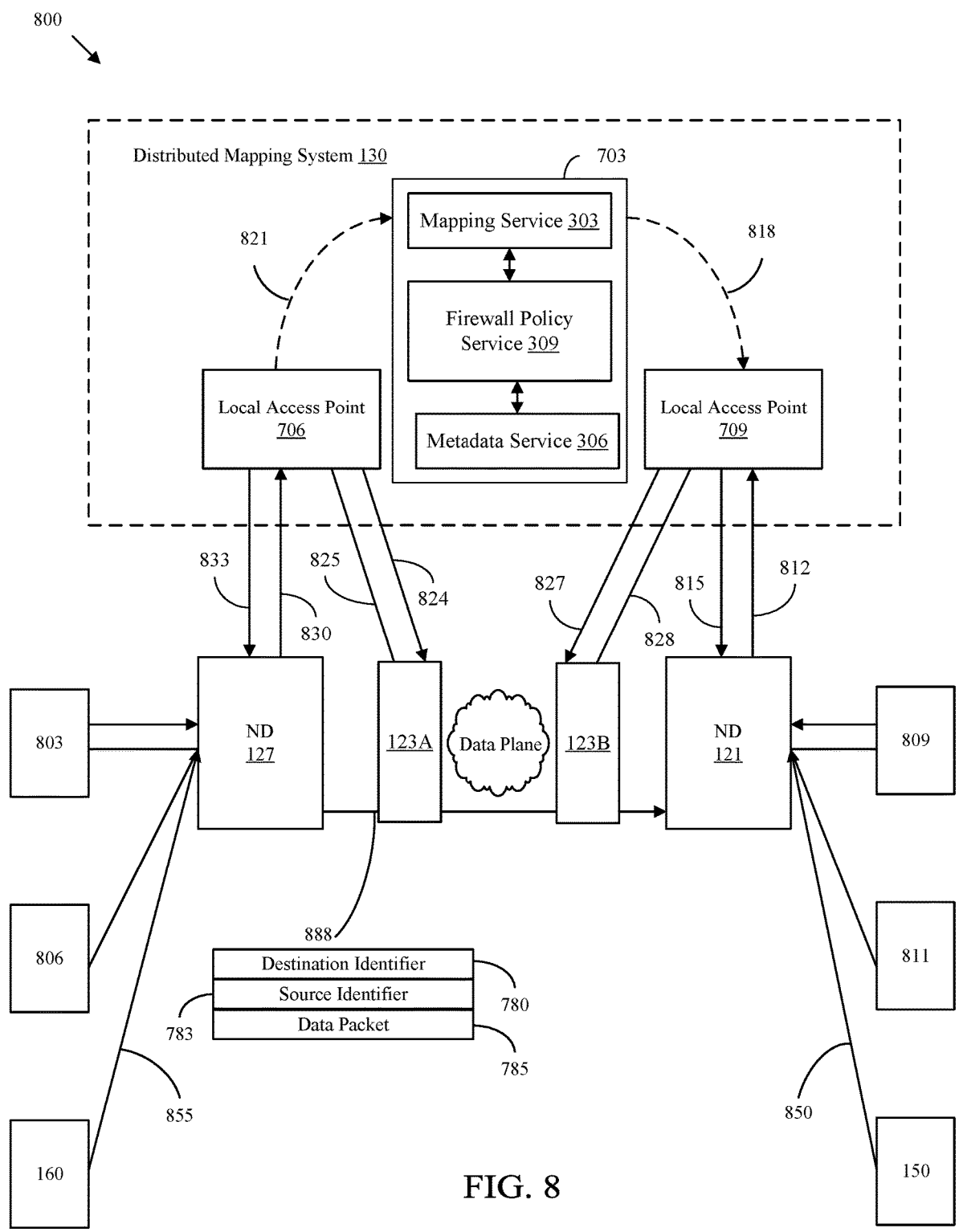
FIG. 8 illustrates another method of registering and implementing a firewall policy in an IEN according to an embodiment of the disclosure.

FIG. 8 illustrates another method of registering and implementing a firewall policy 290 in an IEN 800 according to an embodiment of the disclosure. For example, IEN 800 is similar to IEN 700, except that IEN 800 implements a network device based communication scheme, such as LISP, where NDs 121 and 127 communicate with each other through the distributed mapping system 130 on behalf of host entities 150 and 160. Otherwise, the data transmitted between the host entities 150 and 160, NDs 121 and 127, and the distributed mapping system 130 are similar to that which is discussed in FIG. 7. IEN 800 shows multiple host entities 809, 811, and 150 that are associated with, or reachable via, ND 121 and multiple host entities 803, 806, and 160 that are associated with ND 127. In the above case, anonymized identifiers and firewall policies 290 for the host entities 150 and 160 are obtained and stored by the respective NDs 121 and 127, and host entities 150 and 160 connected to these NDs 121 and 127 communicate through the NDs 121 and 127 and firewalls 123A and 123B.

At step 850, the receiving host entity 150 sends a message comprising one or more firewall policies 290 to ND 121. For example, a Tx 225 of the receiving host entity 150 sends the message to the ND 121. The content of the message may be substantially the same as the content of the message sent at step 712 of FIG. 7. In an embodiment, ND 121 may store and maintain the firewall policies 290 that are contained in the message from the receiving host entity 150. In one embodiment, ND 121 may be configured to perform functions similar to firewalls 123A and 123B to filter data packets according to firewall policies 290.

At step 812, ND 121 forwards the message to the local access point 709 on behalf of the receiving host entity 150. For example, a Tx 225 of the ND 121 sends the message comprising the firewall policies 290 to the local access point 709. The content of the message may be substantially the same as the content of the message sent at step 712 of FIG. 7. At step 815, the local access point 709 sends a response to the ND 121 after the local access point 709 receives the message with the firewall policies 290. For example, a Tx 225 of the local access point 709 transmits the response to the ND 121. The content of the response may be substantially the same as the content of the response sent at step 715 of FIG. 7. Step 818 is substantially the same as step 718 described with reference to FIG. 7, during which the local access point 709 may send the firewall policies 290 received in the message from the ND 121 to the global system 703 to synchronize with the global system 703. For example, a Tx 225 of the local access point 703 sends the firewall policies 290 from the message to the global system 703. The firewall policy service 309 performs steps similar to those described with reference to FIG. 7 after receiving the firewall policies 290 from the local access point 706.

After the firewall policy service 309 has completed obtaining and adding to the firewall policies 290 received from the receiving host entity 150 and stored at the distributed mapping system 130, at steps 825 and 828, the firewalls 123A and 123B may send a request for new or updated firewall policies 290 to the distributed mapping system 130, respectively. For example, Tx 225 of the firewalls 123A and 123B may send a request for new or updated firewall policies 290 to the distributed mapping system 130. In response, at steps 824 and 827, the firewall policy service 309 may transmit the firewall policies 290 to one or more associated firewalls 123A and 12B. For example, Tx 225 of the local access points 706 and 709 may respectively transmit the firewall policies 290 to the firewalls 123A and 123B. The content of the messages sent at steps 824, 825, 827, and 828 may be substantially the same as the content of the message sent at steps 724, 725, 727, and 728 of FIG. 7.

At step 855, the sending host entity 160 sends a message including a locator request to the ND 127. For example, Tx 225 of the sending host entity 160 may send the message including locator request to the ND 127. The content of the message including locator request may be substantially the same as the content of the locator request sent at step 730 of FIG. 7. At step 830, ND 127 forwards the message including locator request to the local access point 706 on behalf of the sending host entity 160. For example, Tx 225 of the ND 127 may send the locator request to the local access point 706. The content of the message including the locator request may also be substantially the same as the content of the message including locator request sent at step 730 of FIG. 7.

Step 821 is substantially similar to step 721 in that at step 821, the local access point 706 may again synchronize or communicate with the global system 703 to determine the current locator of the receiving host entity 150 after receiving the locator request from the sending host entity 160. The mapping service 303, the firewall policy service 309, and the metadata service 306 may perform steps similar to those which are described with reference to FIG. 7 to provide the current locator of the receiving host entity 150 to the sending host entity 160 only when the firewall policies 290 of the receiving host entity 150 permits. If the receiving host entity 150 does not have a firewall policy 290 that prohibits the sending host entity 160 from communicating with the receiving host entity 150, then at step 833, the local access point 706 transmits the locator to the ND 127. For example, Tx 225 of the local access point 706 transmits the locator to the ND 127, which may then store a mapping of the identifier-to-locator of the receiving host entity 150 and forward the mapping to the sending host entity 160. If the receiving host entity 150 does have a firewall policy 290 that prohibits the sending host entity 160 from communicating with the receiving host entity 150, then at step 833, a message indicating that the locator of the receiving host entity 150 is not permitted to be transmitted to the sending host entity 160 may be sent to the ND 127. For example, Tx 225 of the local access point 706 transmits the message to the ND 127, which may forward the message to the sending host entity 160. The content of the messages sent at steps 830 and 833 may be substantially similar to the content of the messages sent at steps 730 and 733 of FIG. 7.

In an embodiment, at step 830, ND 127 forwards the message including locator request to the firewall device 123A instead of the local access point 706. The firewall device 123A may access the locally stored firewall policies to determine whether the sending host entity 160 is permitted to receive the locator of the receiving host entity 150. When the sending host entity 160 is not permitted to receive the locator of the receiving host entity 150, at step 833, a message indicating that the locator of the receiving host entity 150 is not permitted to be transmitted to the sending host entity 160 may be sent to the sending host entity 160. When the sending host entity 160 is permitted to receive the locator of the receiving host entity 150, at step 833, the firewall device 123A may advertise the locator of the receiving host entity 150 corresponding to the identifier in the locator request.

Suppose the sending host entity 160 already stores the current locator for the receiving host entity 150. At step 888, the ND 127 begins to send data packets 785 to the receiving host entity 150 on behalf of the sending host entity 160. For example, ND 127 may have received the data packets 785 from the sending host entity 160 before transmitting the data packets 785 to the firewall device 123A. For example, when the firewall device 123A receives the data packet 785 from the sending host entity 160, the firewall device 123A determines whether to drop the data packet 785 or continue transmission of the data packet 785 to the receiving host entity 150. The firewall device 123A performs steps similar to those which are described in FIG. 7 to discard data packets 785 that have source identifiers that match an identifier included in an identity based firewall policy 290 of the receiving host entity 150. The firewall device 123A similarly discards data packets 785 from sources (e.g., the sending host entity 160) that have metadata 280 that matches metadata 280 in a metadata based firewall policy 290 of the receiving host entity 150.

Although ND 121 is only described as communicating on behalf of receiving host entity 150, ND 121 may also communicate on behalf of host entities 809 and 811 as needed. Similarly, ND 127 may also communicate on behalf of host entities 803 and 806 as needed. As shown by the methods in FIGS. 7 and 8, the firewall device 123 is the firewall closer to the source of the data packet 785. Therefore, embodiments of the present disclosure discard packets closer to the source of the transmission of the packet as opposed to closer to the destination, preventing the unnecessary clogging of network resources.

Figure 9:
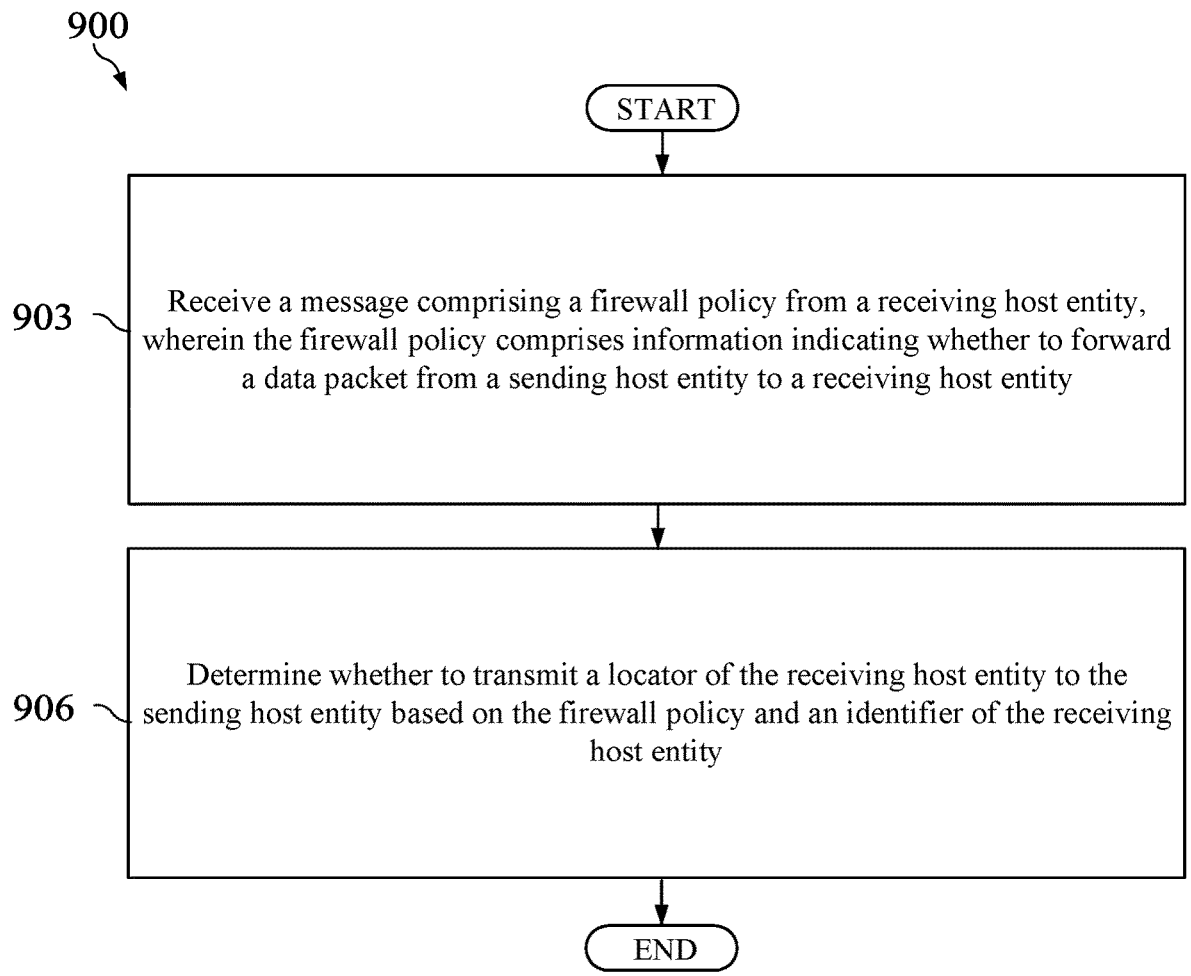
FIG. 9 is a method of implementing identity and metadata based firewalls in an IEN.

FIG. 9 is a method 900 of implementing identity and metadata based firewalls in an IEN. Method 900 may be implemented by an NE 200 in an IEN 100. The NE 200 may be implemented as the distributed mapping system 130. For example, method 900 is implemented after the receiving host entity 150 has completed registration with the distributed mapping system 130. At block 903, a message comprising a firewall policy 290 is received from a receiving host entity 150. For example, a Rx 220 of the receiving host entity 150 receives the message from ND 121 or directly from the receiving host entity 150. The firewall policy 290 comprises information indicating whether to forward a data packet 785 from a sending host entity 160 to a receiving host entity 150. The message may comprise an identifier of the receiving host entity 150 and the firewall policy 290.

At block 906, determine whether to transmit a locator of the receiving host entity 150 to the sending host entity 160 based on the firewall policy 290 and an identifier of the receiving host entity 150. For example, the firewall module 260 of the distributed mapping system 130 is configured to determine whether to transmit a locator of the receiving host entity 150 to the sending host entity 160 based on the firewall policy 290 and an identifier of the receiving host entity 150. In an embodiment, distributed mapping system 130 is configured to determine whether to transmit a locator of the receiving host entity 150 to the sending host entity 160 based on the firewall policy 290 and an identifier of the receiving host entity 150 in response to receiving a locator request from the sending host entity 160. In an embodiment, the locator request may comprise an identifier of the receiving host entity.

Figure 10:
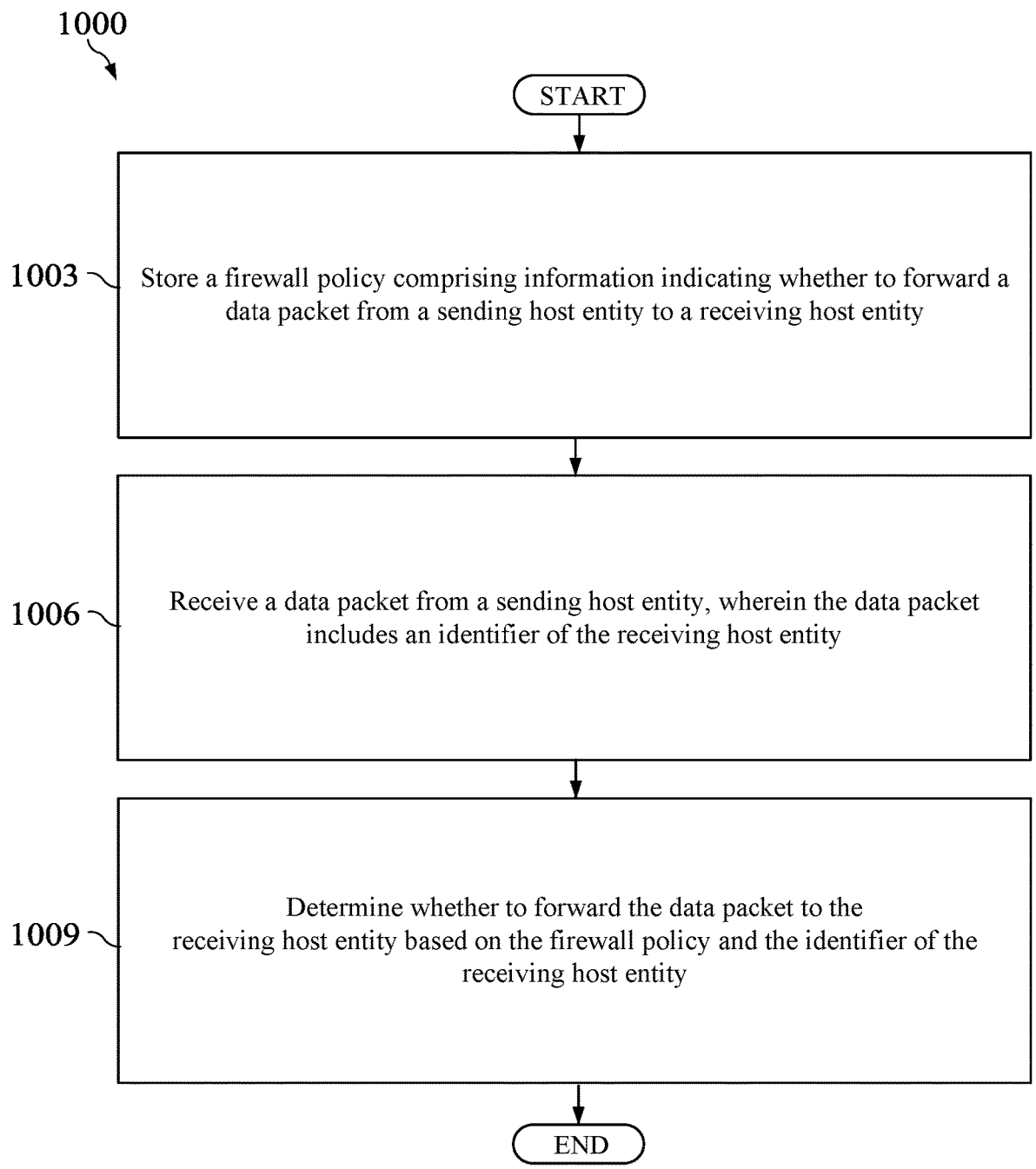
FIG. 10 is a method of implementing identity and metadata based firewalls in an IEN.

FIG. 10 is a method 1000 of implementing identity and metadata based firewalls in an IEN. Method 1000 may be implemented by an NE 200 in an IEN 100. The NE 200 may be implemented as the firewall device 123. For example, method 1000 is implemented after the receiving host entity 150 and the sending host entity 160 have completed subscription with the distributed mapping system 130. At block 1003, a firewall policy 290 is stored in a memory of the firewall device 123. For example, memory 240 stores the firewall policy 290 locally in response to receiving the firewall policy 290 from the distributed mapping system 130. The firewall policy 290 comprises information indicating whether to forward a data packet 785 from a sending host entity 160 to a receiving host entity 150.

At block 1006, a data packet 785 is received from a sending host entity 160. For example, Rx 220 receives the data packet 785 from the sending host entity 160. In an embodiment, the data packet 785 includes an identifier of the sending host entity 160 in a source identifier field 783 of the data packet 785. The data packet 785 may also include an identifier of the receiving host entity 150 in a destination identifier field 780 of the data packet 785. At block 1009, a determination is made regarding whether to forward the data packet 785 to the receiving host entity 150 based on the firewall policy 290 and the identifier of the receiving host entity 150. For example, the firewall module 260 is configured to determine whether to forward the data packet 785 to the receiving host entity 150 based on the firewall policy 290.

In an embodiment, the disclosure includes a method and apparatus comprising a means for storing a firewall policy comprising information indicating whether to forward a data packet from a sending host entity to a receiving host entity, a means for receiving a data packet from a sending host entity, wherein the data packet includes an identifier of the receiving host entity, and a means for determining whether to forward the data packet to the receiving host entity based on the firewall policy and the identifier of the receiving host entity.

In an embodiment, the disclosure includes an apparatus comprising a means for receiving a message comprising a firewall policy from a receiving host entity, wherein the firewall policy comprises information indicating whether to forward a data packet from a sending host entity to a receiving host entity, and determining whether to transmit a locator of the receiving host entity to the sending host entity based on the firewall policy and an identifier of the receiving host entity.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled may be directly coupled or may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented by a firewall device in a network, comprising:
   receiving, by a receiver of the firewall device, a data packet from a sending host entity, wherein the data packet includes an identifier of a receiving host entity;
   determining, by one or more processors coupled to the receiver of the firewall device, from a plurality of firewall policies stored in a memory of the firewall device, a firewall policy corresponding to the receiving host entity;
   determining, by the one or more processors, from metadata describing the sending host entity stored in the memory of the firewall device, whether the metadata describing the sending host entity matches metadata included in the determined firewall policy, the metadata describing the sending host entity indicating a type of device of the sending host entity, the metadata included in the determined firewall policy indicating one or more types of devices that are permitted to or prohibited from communicating with the receiving host entity, the determined firewall policy indicating whether to forward the data packet from the sending host entity to the receiving host entity when the metadata describing the sending host entity matches metadata included in the determined firewall policy; and
   determining, by the one or more processors, whether to forward the data packet to the receiving host entity based on whether the metadata describing the sending host entity matches the metadata included in the determined firewall policy.

2. The method of claim 1, further comprising receiving, by the receiver, the determined firewall policy from the receiving host entity prior to receiving the data packet from the sending host entity.

3. The method of claim 1, further comprising receiving, by the receiver, the determined firewall policy from a distributed mapping system prior to receiving the data packet from the sending host entity.

4. The method of claim 1, wherein the metadata included in the determined firewall policy indicates one or more types of devices that are prohibited from communicating with the receiving host entity, wherein determining whether to forward the data packet to the receiving host entity based on the determined firewall policy comprises discarding the data packet when the metadata describing the sending host entity matches the metadata included in the determined firewall policy.

5. The method of claim 1, wherein the metadata included in the determined firewall policy indicates one or more types of devices that are permitted to communicate with the receiving host entity, and wherein determining whether to forward the data packet to the receiving host entity based on the firewall policy comprises forwarding the data packet to the receiving host entity when the metadata describing the sending host entity matches the metadata included in the determined firewall policy.

6. The method of claim 1, further comprising:
   determining, by the processor, another firewall policy for another host entity based on similarities between the receiving host entity and the other host entity;
   receiving, by the receiver, a second data packet including an identifier of the sending host entity in a source identifier field and an identifier of the other host entity in a destination identifier field; and
   determining, by the processor, whether to forward the second data packet to the other host entity based on the other firewall policy.

7. The method of claim 1, further comprising periodically polling a distributed mapping system for an update to the determined firewall policy.

8. A firewall device implemented as a network element in a network, comprising:
   a receiver configured to receive a data packet from a sending host entity, wherein the data packet includes an identifier of a receiving host entity; and
   a processor coupled to the memory and the receiver, wherein the processor is configured to:
   determine, from a plurality of firewall policies stored in a memory of the firewall device, a firewall policy corresponding to the receiving host entity;
   determine, from metadata describing the sending host entity stored in the memory of the firewall device, whether the metadata describing the sending host entity matches metadata included in the determined firewall policy of the receiving host entity, the metadata describing the sending host entity indicating a type of device of the sending host entity, the metadata included in the determined firewall policy indicating one or more types of devices that are permitted to or prohibited from communicating with the receiving host entity, the determined firewall policy indicating whether to forward the data packet from the sending host entity to the receiving host entity when the metadata describing the sending host entity matches metadata included in the determined firewall policy; and determine whether to forward the data packet to the receiving host entity based on whether the metadata describing the sending host entity matches the metadata included in the determined firewall policy.

9. The firewall device of claim 8, wherein the receiver is further configured to:

receive the determined firewall policy directly from the receiving host entity prior to receiving the data packet from the sending host entity; and receive a subsequent update to the determined firewall policy directly from the receiving host entity.

10. The firewall device of claim 8, wherein the receiver is further configured to:

receive the determined firewall policy directly from a distributed mapping system prior to receiving the data packet from the sending host entity; and receive a subsequent update to the determined firewall policy directly from the distributed mapping system.

11. The firewall device of claim 8, wherein the metadata included in the determined firewall policy indicates one or more types of devices that are prohibited from communicating with the receiving host entity, wherein the processor is configured to discard the data packet when the metadata describing the sending host entity matches the metadata included in the determined firewall policy.

12. The firewall device of claim 8, wherein the metadata included in the determined firewall policy indicates one or more types of devices that are permitted to communicate with the receiving host entity, and wherein the processor is configured to forward the data packet to the receiving host entity when the metadata describing the sending host entity matches the metadata included in the determined firewall policy.

13. The firewall device of claim 8, wherein the processor is configured to determine additional policies for a plurality of different host entities based on similarities between the determined firewall policy and metadata describing the receiving host entity.

14. A distributed mapping system implemented as a network element in a network, comprising:

a memory storage comprising instructions; and one or more processors in communication with the memory storage, wherein the one or more processors execute the instructions to:

receive a message comprising a firewall policy corresponding to a receiving host entity from the receiving host entity, the firewall policy comprising metadata indicating one or more types of devices that are permitted to or prohibited from communicating with the receiving host entity, the firewall policy indicating whether to transmit a locator of the receiving host entity to the sending host entity;

receive a request from the sending host entity for the locator of the receiving host entity, wherein the data packet includes an identifier of the receiving host entity;

determine whether metadata describing the sending host entity matches the metadata included in the firewall policy corresponding to the receiving host entity; and determine whether to transmit the locator of the receiving host entity to the sending host entity based on whether the metadata describing the sending host entity matches the metadata included in the firewall policy corresponding to the receiving host entity.

15. The distributed mapping system of claim 14, wherein the one or more processors execute the instructions to determine whether to transmit the locator of the receiving host entity to the sending host entity based on the firewall policy in response to receiving a locator request from the sending host entity, wherein the locator request comprises an identifier of the receiving host entity.

16. The distributed mapping system of claim 14, wherein the one or more processors further execute the instructions to store a plurality of identifiers of a plurality of different host entities.

17. The distributed mapping system of claim 14, wherein the one or more processors further execute the instructions to store a plurality of firewall policies for a plurality of different host entities.

18. The distributed mapping system of claim 14, wherein the one or more processors further execute the instructions to determine a second policy for another host entity based on similarities between the receiving host entity and the other host entity.

19. The distributed mapping system of claim 14, wherein the one or more processors further execute the instructions to periodically send updates related to the firewall policy to a firewall device associated with the receiving host entity.

20. The distributed mapping system of claim 14, wherein the firewall policy indicates a plurality of different identifiers of different types that are used to identify the receiving host entity.

* * * * *

UNITED STATES PATENT AND TRADEMARK OFFICE
CERTIFICATE OF CORRECTION

PATENT NO. : 10,958,623 B2
APPLICATION NO. : 15/969135
DATED : March 23, 2021
INVENTOR(S) : Padmadevi Pillay-Esnault et al.

Page 1 of 1

It is certified that error appears in the above-identified patent and that said Letters Patent is hereby corrected as shown below:

In the Claims

Column 30, Claim 8, Lines 49 to 67 through Column 31, Lines 1-11, should read:
8. A firewall device implemented as a network element in a network, comprising:
    a receiver configured to receive a data packet from a sending host entity, wherein the data packet includes an identifier of a receiving host entity; and
    a processor coupled to a memory and the receiver, wherein the processor is configured to:
        determine, from a plurality of firewall policies stored in a memory of the firewall device, a firewall policy corresponding to the receiving host entity;
        determine, from metadata describing the sending host entity stored in the memory of the firewall device, whether the metadata describing the sending host entity matches metadata included in the determined firewall policy of the receiving host entity, the metadata describing the sending host entity indicating a type of device of the sending host entity, the metadata included in the determined firewall policy indicating one or more types of devices that are permitted to or prohibited from communicating with the receiving host entity, the determined firewall policy indicating whether to forward the data packet from the sending host entity to the receiving host entity when the metadata describing the sending host entity matches metadata included in the determined firewall policy; and
        determine whether to forward the data packet to the receiving host entity based on whether the metadata describing the sending host entity matches the metadata included in the determined firewall policy.

Signed and Sealed this
Twenty-seventh Day of April, 2021

Drew Hirshfeld
*Performing the Functions and Duties of the
Under Secretary of Commerce for Intellectual Property and
Director of the United States Patent and Trademark Office*